(12) United States Patent
Ouchi et al.

(10) Patent No.: US 8,416,844 B2
(45) Date of Patent: Apr. 9, 2013

(54) OFDM RECEIVING APPARATUS, OFDM RECEIVING METHOD, OFDM RECEIVING CIRCUIT, INTEGRATED CIRCUIT, AND PROGRAM

(75) Inventors: Mikihiro Ouchi, Osaka (JP); Kenichiro Hayashi, Kyoto (JP); Tomohiro Kimura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/593,127

(22) PCT Filed: Mar. 25, 2008

(86) PCT No.: PCT/JP2008/000706
§ 371 (c)(1),
(2), (4) Date: Sep. 25, 2009

(87) PCT Pub. No.: WO2008/129825
PCT Pub. Date: Oct. 30, 2008

(65) Prior Publication Data
US 2010/0128822 A1    May 27, 2010

(30) Foreign Application Priority Data
Mar. 27, 2007  (JP) .................................. 2007-080936

(51) Int. Cl.
*H03K 5/159*  (2006.01)
*H03K 9/00*  (2006.01)
*H04L 7/00*  (2006.01)
(52) U.S. Cl. ........................ 375/229; 375/316; 375/354
(58) Field of Classification Search .................. 375/316, 375/295, 229–235, 240.26–240.29, 285, 375/375/347, 340, 339, 338, 354, 355, 346, 375/362, 364, 219, 299, 321
See application file for complete search history.

(56) References Cited

U.S. PATENT DOCUMENTS

| 6,449,245 B1* | 9/2002 | Ikeda et al. .................. 370/208 |
| 2007/0036232 A1* | 2/2007 | Hayashi ........................ 375/260 |
| 2007/0274406 A1* | 11/2007 | Adachi ........................ 375/260 |

FOREIGN PATENT DOCUMENTS

| GB | 2 369 016 | 5/2002 |
| GB | 2 376 855 | 12/2002 |
| GB | 2 395 094 | 5/2004 |

(Continued)

OTHER PUBLICATIONS

International Search Report dated Jul. 1, 2008 for International Application No. PCT/JP2008/000706.

(Continued)

*Primary Examiner* — Sam K Ahn
*Assistant Examiner* — Linda Wong
(74) *Attorney, Agent, or Firm* — Wenderoth, Lind & Ponack, L.L.P.

(57) ABSTRACT

A synchronization section specifies a position of a guard interval correlation's center of gravity based on a guard interval correlation value, and calculates a carrier-direction shift amount Fshift. An equalization section shifts the passband of a carrier interpolation filter of a carrier interpolation section by the carrier-direction shift amount Fshift calculated by the synchronization section. This shift processing causes the delay profile to be kept in the center of the passband of the carrier interpolation filter, for any FFT window position. This enables transmission path estimation without limiting a range of an FFT window position even if the passband of the carrier interpolation filter is narrower than a guard interval of an OFDM signal.

13 Claims, 36 Drawing Sheets

FOREIGN PATENT DOCUMENTS

| | | |
|---|---|---|
| JP | 2004-336279 | 11/2004 |
| JP | 2004-343480 | 12/2004 |
| JP | 2005-260331 | 9/2005 |
| JP | 2005-312027 | 11/2005 |
| JP | 2006-5396 | 1/2006 |
| JP | 2006-140987 | 6/2006 |
| JP | 2006-311385 | 11/2006 |
| JP | 2007-318315 | 12/2007 |
| WO | 2005/109712 | 11/2005 |
| WO | 2008/023539 | 2/2008 |

OTHER PUBLICATIONS

Satoshi Kimura et al., "Performance of High Speed Mobile Reception for Digital Terrestrial Broadcasting by One Symbol Channel Estimation", The Technical Report on the Institute of Image Information and Television Engineers, BCT 2005-69, Jun. 2005, pp. 1-4.

* cited by examiner

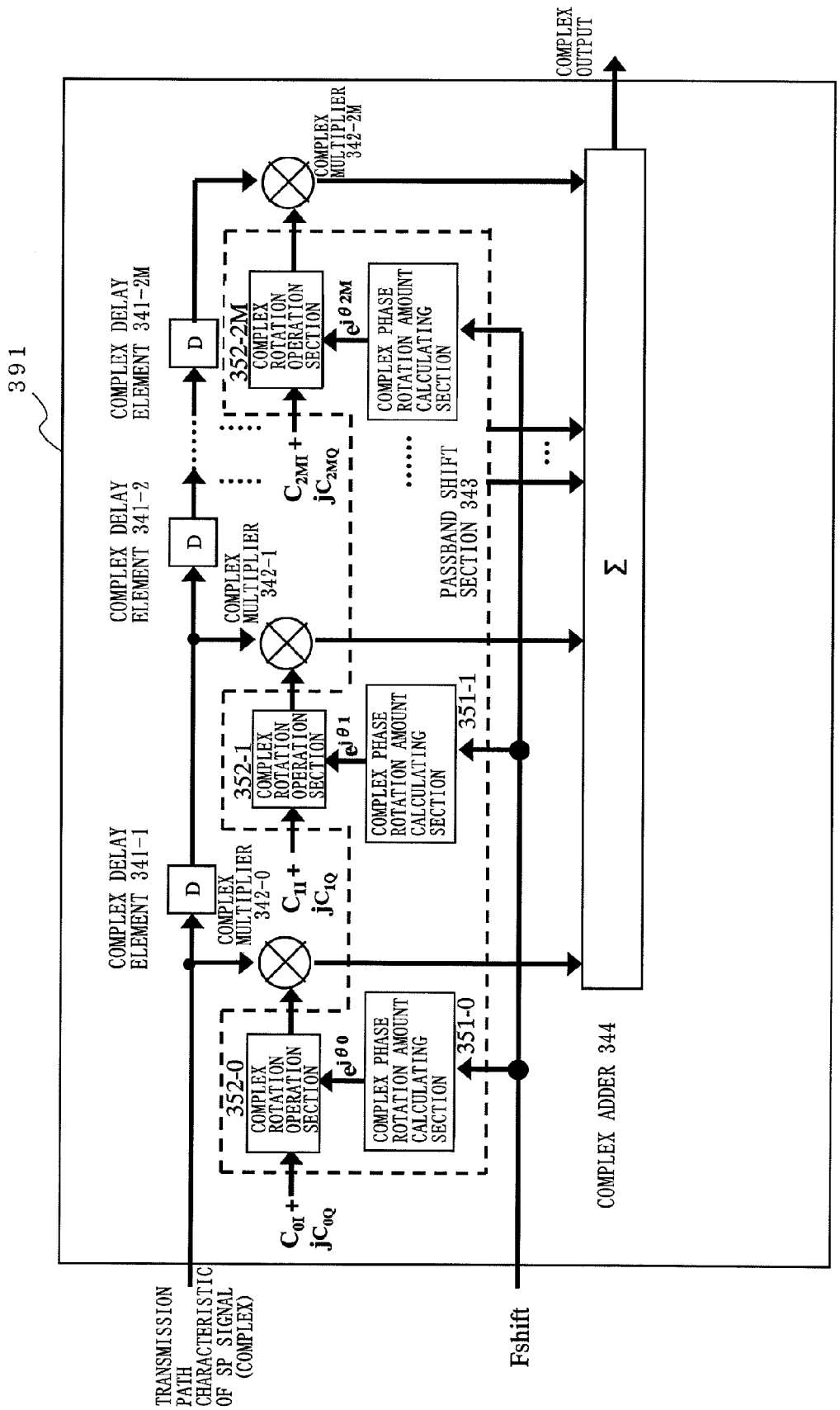
F I G. 18

US 8,416,844 B2

OFDM RECEIVING APPARATUS, OFDM RECEIVING METHOD, OFDM RECEIVING CIRCUIT, INTEGRATED CIRCUIT, AND PROGRAM

TECHNICAL FIELD

The present invention relates to a technique for improving reception performance of an OFDM (Orthogonal Frequency Division Multiplexing) signal, which is used for digital terrestrial broadcasting or the like.

BACKGROUND ART

Digital terrestrial broadcasting, and IEEE 802.11a which is a transmission standard of the wireless LAN, employ an OFDM system. The OFDM system is a multicarrier system in which multiple subcarriers are multiplexed and transmitted within a bandwidth of one channel. The OFDM system is known as a system which is highly resistant to multipath interference since the symbol interval length is long in comparison with a case of a single carrier transmission. In addition, by providing so-called a guard interval which is obtained by cyclically copying a part of an effective symbol, an advantage that multipath does not cause intersymbol interference is obtained as long as the multipath occurs within the guard interval.

In Japan and Europe, transmission standards used for digital terrestrial broadcasting are called an ISDB-T system and a DVB-T system, respectively. Hereinafter, transmission processing and reception processing which are common to the ISDB-T system and the DVB-T system will be described.

In the ISDB-T system and the DVB-T system, pilot signals whose amplitude and phase are already known are scattered with respect to the frequency domain and inserted in subcarriers. These pilot signals are referred to as scattered pilot signals (hereinafter, marked down as SP signals). FIG. 24 shows an arrangement of the SP signals. In FIG. 24, the SP signals are located, in the frequency (subcarrier) direction and time (symbol) direction, at carrier positions where a symbol number n and a carrier number k satisfy k=3(n mod 4)+12p (mod indicates remainder operation, and p is an integer number). That is, the SP signal is iteratively located in cycles of four symbols and the SP signals are shifted by three carriers with respect to each symbol. The SP signals which have been located in such a manner are modulated into binary data based on particular patterns determined depending on the carrier positions of the SP signals, and then transmitted.

Moreover, in the ISDB-T system and the DVB-T system, by using carriers at which the SP signals are not located, information transmission signals are modulated by a method such as QPSK, 16 QAM, 64 QAM, or the like, and then transmitted.

FIG. 25 shows a configuration of a conventional OFDM transmitting apparatus 1000 in which the ISDB-T system and the DVB-T system are used. The conventional OFDM transmitting apparatus 1000 includes an error correction coding section 1001, a mapping section 1002, an interleaving section 1003, a frame constructing section 1004, an IFFT processing section 1005, a guard interval adding section 1006, an RF frequency conversion section 1007, and an antenna 1008.

Hereinafter, operation of the conventional OFDM transmitting apparatus 1000 will be described.

The error correction coding section 1001 performs error correction coding processing on an information transmission signal. The mapping section 1002 maps data obtained through the error correction coding processing, through QPSK, 16 QAM, 64 QAM, or the like. The interleaving section 1003 performs interleaving, such as time interleaving, frequency interleaving, or the like, on data obtained by the mapping, on a subcarrier symbol basis. The frame constructing section 1004 arranges each carrier symbol unit of the interleaved data with SP signals in accordance with the arrangement diagram shown in FIG. 24, thereby constructing frames. The IFFT processing section 1005 transforms the constructed frames of data into a signal in the time domain. The guard interval adding section 1006 adds guard intervals to the data transformed into a signal in the time domain. As shown in FIG. 26, the guard intervals are obtained by cyclically copying and adding the rear part of the effective symbol to a front part of the symbol. That is, one symbol interval includes a guard interval and the effective symbol interval which follows the guard interval. The RF frequency conversion section 1007 converts, to an RF frequency, the signal to which the guard intervals have been added. The antenna 1008 transmits the signal converted to an RF frequency.

FIG. 27 shows a configuration of a conventional OFDM receiving apparatus 1100 in which the ISDB-T system and the DVB-T system are used. The conventional OFDM receiving apparatus 1100 includes an antenna 1101, a tuning section 1102, a demodulation section 1111, and an error correction decoding section 1108. Moreover, the demodulation section 1111 includes an A/D conversion section 1103, a quadrature detection section 1104, a synchronization section 1105, an FFT processing section 1106, and an equalization section 1107.

Hereinafter, operation of the conventional OFDM transmitting apparatus 1100 will be described.

The antenna 1101 receives a radio wave, and the tuning section 1102 selectively receives an OFDM signal of a desired channel and downconverts the OFDM signal to a selected frequency. The A/D conversion section 1103 A/D-converts the downconverted OFDM signal. The quadrature detection section 1104 performs quadrature detection of the A/D-converted digital signal. The synchronization section 1105 performs synchronization processing such as symbol synchronization, sampling frequency synchronization, frequency synchronization, and the like, and determines an FFT window position. The FFT processing section 1106 transforms a signal in the time domain into a signal in the frequency domain through FFT processing. The equalization section 1107 calculates a transmission path frequency response from the signal in the frequency domain outputted by the FFT processing section 1106, and then performs equalization processing on the signal in the frequency domain based on the transmission path frequency response. The error correction decoding section 1108 performs error correction processing on the signal on which equalization processing has been performed, and thereby outputs a TS (Transport Stream) signal.

FIG. 28 shows in detail a configuration of the equalization section 1107 in FIG. 27. The equalization section 1107 includes an SP demodulation section 1201, a symbol interpolation section 1202, a carrier interpolation section 1203, a delay section 1204, and a complex division section 1205.

Hereinafter, operation of the equalization section 1107 will be described.

The SP demodulation section 1201 extracts the SP signals from the signal in the frequency domain outputted by the FFT processing section 1106, in accordance with the arrangement of the SP signals shown in FIG. 24. The SP demodulation section 1201 performs complex division on the SP signals by predetermined patterns which are determined depending on the carrier positions of the SP signals, and thereby outputs transmission path characteristic estimates for the SP signal positions. The symbol interpolation section 1202 interpolates the transmission path characteristics for the SP signal positions in the time-axis direction as shown in FIG. 29, and thereby outputs transmission path characteristic estimates for each three carriers. The carrier interpolation section 1203 interpolates the transmission path characteristics for each three carriers in the frequency-axis direction as shown in FIG. 30, and thereby outputs transmission path characteristic estimates for all carrier positions. In the above-described transmission path estimation method, first, interpolation is performed in the time-axis direction by using the SP signal at four-symbol intervals. Hereinafter, this method is referred to as "4-symbol equalization".

The delay section 1204 performs delay matching between the transmission path characteristic estimates for all carrier positions outputted by the carrier interpolation section 1203, and the signal in the frequency domain outputted by the FFT processing section 1106. The complex division section 1205 complex-divides the signal in the frequency domain outputted by the delay section 1204 by the transmission path characteristic estimates for all the carrier positions outputted by the carrier interpolation section 1203, and whereby the received signal is equalized.

On the other hand, FIG. 31 shows a configuration of an equalization section 1300 disclosed in a Non-Patent Document. The equalization section 1300 in FIG. 31 is obtained by removing the symbol interpolation section 1202 from the equalization section 1107 in FIG. 28 and including a carrier interpolation section 1301 instead of the carrier interpolation section 1203. As shown in FIG. 32, the equalization section 1300 causes the carrier interpolation section 1301 to interpolate, in the frequency-axis direction, the transmission path characteristics for the SP signal positions outputted by the SP demodulation section 1201 without interpolating the transmission path characteristics in the time-axis direction, and thereby outputs the transmission path characteristic estimates for all the carrier positions. That is, in this transmission estimation method, calculation is independently performed for each single symbol to obtain the transmission path characteristic estimates for all the carrier positions. Hereinafter, this method is referred to as "1-symbol equalization".

When using the 1-symbol equalization, resolution in the frequency direction is lowered in comparison with when using the 4-symbol equalization, and therefore estimation accuracy in the frequency direction is deteriorated. However, in high-speed mobile reception, estimation accuracy in the time direction can be enhanced.

FIG. 33 shows a configuration of an equalization section 1400 disclosed in Patent Document 1. The equalization section 1400 in FIG. 33 is obtained by adding the carrier interpolation section 1301 for the 1-symbol equalization shown in FIG. 31, an amplitude variation detecting section 1401, and a switching section 1402 to the equalization section 1107 in FIG. 28. In the equalization section 1400, the amplitude variation detecting section 1401 detects the amplitude variation rate of the carrier, and switches between the 1-symbol equalization and the 4-symbol equalization in accordance with the result of the detection.

With this configuration, when the amplitude variation rate is large, the 1-symbol equalization is performed and thereby estimation accuracy in the time direction can be enhanced in high-speed mobile reception, and when the amplitude variation rate is small, the 4-symbol equalization is performed and thereby estimation accuracy in the frequency characteristic can be maintained.

Patent Document 1: Japanese Laid-Open Patent Publication No. 2006-140987
Patent Document 2: Japanese Laid-Open Patent Publication No. 2004-336279
Patent Document 3: Japanese Laid-Open Patent Publication No. 2005-312027
Non-Patent Document 1: Kimura and others "Performance of high-speed mobile reception for digital terrestrial broadcasting by one symbol channel estimation", The Technical Report on the Institute of Image Information and Television Engineers, BCT 2005-69, Jun. 2005.

SUMMARY OF THE INVENTION

Problems to be Solved by the Invention

FIG. 34 shows a relationship between: the FFT window position in a case where the guard interval is ⅛ and one wave arrives; and the delay profile with the passband of the carrier interpolation filter. As shown in FIG. 34, if the effective symbol length is Tu and the guard interval is Tg, Tg is expressed by Tg=Tu/8. Wherein, the delay profile indicates the relative ratio between the reception level of a direct wave and a reception level of the delay wave, and delay time between the direct wave and the delay wave. When FFT is yet to be performed, the delay profile in the time domain can be observed by using the below-described guard interval correlation. When FFT has been performed, the delay profile in the frequency domain can be observed at the IFFT output of the transmission path characteristics. As shown in FIG. 34, in the output of the FFT processing section 1106, i.e., in the frequency domain, variation of the FFT window with respect to the arrival wave leads to the variation of the delay time of the transmission path characteristics. This variation of the delay time leads to the shift of the carrier direction frequency characteristic (whose dimension is delay time) of the transmission path characteristics.

Here, if band shift processing by −Tg/2 is performed at the output stage of the FFT processing section 1106 in FIG. 27, the delay wave within the guard interval is kept within a range from −Tg/2 to Tg/2 in a carrier interpolation filter band. Therefore, the carrier interpolation filter can be formed by a real filter in which the I-axis and the Q-axis are independent of each other.

As shown in FIG. 30, the carrier interpolation filter for the 4-symbol equalization interpolates the transmission path characteristics for each three carries in the frequency-axis direction. Therefore, by configuring the carrier interpolation filter such that the range of the passband thereof is from −Tu/6 to Tu/6, the transmission path characteristics can be calculated through interpolation as long as the delay profile is kept within the range (FIG. 34). Moreover, as shown in FIG. 32, the carrier interpolation filter for the 1-symbol equalization interpolates the transmission path characteristics for each twelve carriers in the frequency-axis direction. Therefore, by configuring the carrier interpolation filter such that the range of the passband thereof is from −Tu/24 to Tu/24, the transmission path characteristics can be calculated through interpolation as long as the delay profile is kept within the range (FIG. 34).

Thus, if the front edge of the FFT window position is within the guard interval, intersymbol interference is not caused. This range is from an FFT window position (b) to an FFT window position (c) in FIG. 34. If the front edge of the window position is at the center of the guard interval as in a case of an FFT window position (a), the delay profile is kept in the center of the passband of the carrier interpolation filter.

However, if the front edge of the window position is at the front edge of the guard interval as in the FFT window position (b), the delay profile shifts from the center of the passband by Tg/2 (=Tu/16). Moreover, if the front edge of the window position is at the rear edge of the guard interval as in the FFT window position (c), the delay profile shifts from the center of the passband by −Tg/2 (−Tu/16). Therefore, although the delay profile is kept within the passband of the carrier interpolation filter when using the 4-symbol equalization, the delay profile is out of the passband of the carrier interpolation filter when using the 1-symbol equalization, and therefore transmission path estimation cannot be performed.

This problem occurs in the same manner also in a case where two waves arrive. FIG. 35 shows a relationship between: the FFT window position in a case where the guard interval is ⅛, two waves arrive, and the delay difference is Tg/2; and the delay profile with the passband of the carrier interpolation filter.

If the front edge of the FFT window position is within the guard intervals of the two arrival waves, intersymbol interference is not be caused. This range is from an FFT window position (b) to an FFT window position (c) in FIG. 35. When using the 4-symbol equalization, the delay profiles of the two arrival waves are kept within the passband of the carrier interpolation filter. When using the 1-symbol equalization, if the front edge of the window position is at the middle between the FFT window position (b) and the FFT window position (c) as in the FFT window position (a), the delay profiles of the two arrival waves are kept within the passband of the carrier interpolation filter. However, in the FFT window position (b) or the FFT window position (c), the delay profiles are out of the passband of the carrier interpolation filter and therefore transmission path estimation cannot be performed.

As described above, when using the 1-symbol equalization, if the FFT window position is arbitrarily determined within a range which will not cause intersymbol interference, there is a problem that transmission path estimation cannot be performed. One of the solutions to this problem is to limit the range of the FFT window position so as to keep, in advance, the delay profiles of the arrival waves within the passband of the carrier interpolation filter for the 1-symbol equalization. However, due to the limitation of the range of the FFT window position, this method has a disadvantage that intersymbol interference may not be minimized when the 4-symbol equalization is used.

Another solution to this problem is to adopt a conventional FFT window position control disclosed in Patent Document 2. FIG. 36 shows a configuration of a synchronization section 1501 of the conventional FFT window position control. The synchronization section 1501 includes a buffer memory 1502, a control FFT 1503, a control equalization section 1504, an S/N calculating section 1505, and a time window control section 1506.

Hereinafter, operation of the conventional synchronization section 1501 will be described.

When a new FFT window position is detected, the time window control section 1506 controls the buffer memory 1502 such that the buffer memory 1502 stores and retrieves an OFDM time-domain signal outputted by the quadrature detection section 1104. The time window control section 1506 sets an FFT window position for the control FFT 1503. The control FFT 1503 outputs the OFDM frequency-domain signal, the control equalization section 1504 performs equalization, the S/N calculating section 1505 calculates S/N and outputs the S/N as reception quality, and a time window control section 1506 stores the reception quality. The time window control section 1506 repeats the above processing while sequentially changing the FFT window position. An FFT window position which has optimum reception quality is determined as a new FFT window position, and the FFT window position is outputted to the FFT processing section 1106. That is, by using the buffer memory 1502, the FFT window position is sequentially changed for one OFDM time time-domain signal, and an FFT window position which has optimum reception quality is determined as a new FFT window position.

However, in a case where the conventional FFT window position control is adopted, there is a time difference between an OFDM time-domain signal used for FFT window position setting and an OFDM time-domain signal to which the determined FFT window position is applied. In addition, since a plurality of FFT window positions are detected while sequentially changing the FFT window position, the time difference increases. Therefore, in high-speed mobile reception, it can occur that the delay profile changes during the time difference and thus transmission path estimation is adversely affected. Particularly, when using the 1-symbol equalization, since the passband is narrow, the delay profile is out of the passband of the carrier interpolation filter, thereby increasing a probability that transmission path estimation cannot be performed.

Patent Document 3 discloses an invention in which, in order to reduce noise of a transmission path frequency response, a passband width of the carrier interpolation filter is appropriately selected based on a delay spread while the transmission path frequency response is shifted based on the delay spread. That is, the invention of Patent Document 3 discloses detecting a shift amount by considering only a spread of the delay time of the profile.

The primary cause of the above-described problem is that the passband (Tu/12) of the carrier interpolation filter for the 1-symbol equalization is narrower than the guard interval Tg (=Tu/8). Therefore, not only in the 1-symbol equalization, but also in the 4-symbol equalization, there is a problem that, if the carrier interpolation filter is configured such that the passband is narrower than the guard interval, transmission path estimation cannot be performed.

Therefore, an object of the present invention is to provide an OFDM receiving apparatus enabling transmission path estimation in both of the 1-symbol equalization and the 4-symbol equalization without limiting a range of an FFT window position even if the passband of the carrier interpolation filter is narrower than the guard interval.

Solution to the Problems

The present invention is directed to an OFDM receiving apparatus for receiving an OFDM signal. In order to achieve the above object, an OFDM receiving apparatus includes: a Fourier transform section for transforming a signal in the time domain into a signal in the frequency domain; and an equalization section for calculating a transmission path frequency response from the signal in the frequency domain outputted by the Fourier transform section, and performing equalization processing on the signal in the frequency domain based on the transmission path frequency response. The equalization section includes a carrier interpolation section for, when the transmission path frequency response is calculated and when a passband of a carrier interpolation filter is narrower than a guard interval of the OFDM signal, shifting the passband based on a shift amount which is determined so as to increase energy of the transmission path frequency response included in the passband.

The equalization section may further include: a second carrier interpolation section having a passband different from that of the carrier interpolation section; and a switching section for selecting either an output of the carrier interpolation section or an output of the second carrier interpolation section.

Preferably, the OFDM receiving apparatus of the present invention further includes a synchronization section for establishing synchronization and determining the shift amount based on a profile information of an arrival wave, and the carrier interpolation section shifts the passband based on the shift amount determined by the synchronization section. In this case, the synchronization section may obtain the profile information of the arrival wave by calculating a correlation among guard intervals of the OFDM signal. In addition, it is desirable that the synchronization section determines the shift amount based on the profile information of the arrival wave such that a position of a guard interval correlation's center of gravity which is defined by using a balance between powers or amplitudes within bins of a profile and delay times within the bins, is shifted to the center of the passband of the carrier interpolation filter.

Typically, the carrier interpolation section includes: a plurality of delay elements for delaying an input; a plurality of multipliers for multiplying outputs of the plurality of delay elements by coefficients used in interpolation processing in a carrier direction, respectively; a passband shift section for calculating, based on the shift amount, phase rotation amounts respectively for the outputs of the plurality of multipliers, and performing phase rotation for the outputs of the plurality of multipliers by the phase rotation amounts, respectively; and an adder for summing and outputting all outputs of the passband shift section. Alternatively, the carrier interpolation section includes: a plurality of delay elements for delaying an input; a passband shift section for calculating, based on the shift amount, phase rotation amounts respectively for the outputs of the plurality of delay elements, and performing phase rotation for the outputs of the plurality of delay elements by the phase rotation amounts, respectively; a plurality of multipliers for multiplying outputs of the passband shift section by coefficients used in interpolation processing in a carrier direction, respectively; and an adder for summing and outputting all outputs of the plurality of multipliers. Alternatively, the carrier interpolation section includes: a plurality of delay elements for delaying an input; coefficients used in interpolation processing in a carrier direction; a passband shift section for calculating, based on the shift amount, phase rotation amounts respectively for the coefficients used in interpolation processing in a carrier direction, and performing phase rotation for the coefficients used in interpolation processing in a carrier direction by the phase rotation amounts, respectively; a plurality of multipliers for multiplying outputs of the plurality of delay elements by outputs of the passband shift section, respectively; and an adder for summing and outputting all outputs of the plurality of multipliers.

An OFDM receiving circuit can be realized by using: a tuning section for selectively receiving a signal of a tuned frequency channel; a demodulation section for demodulating the signal selectively received by the tuning section which includes the above OFDM receiving apparatus; and an error correction section for correcting an error of the signal demodulated by the demodulation section. The demodulation section and the error correction section may be included in an integrated circuit. In addition, processing performed by the above OFDM receiving apparatus can be considered as an OFDM receiving method. The steps of processing performed in the OFDM receiving method may be stored as a method program.

EFFECT OF THE INVENTION

The present invention described above makes it possible to keep a delay profile of an arrival wave within a passband of a carrier interpolation filter and perform transmission path estimation, without limiting a range of an FFT window position, even if the passband of the carrier interpolation filter is narrower than a guard interval of an OFDM signal.

BRIEF DESCRIPTION OF THE DRAWINGS

FIG. 18 shows in detail a configuration of a carrier interpolation section 391.

Figure 1:
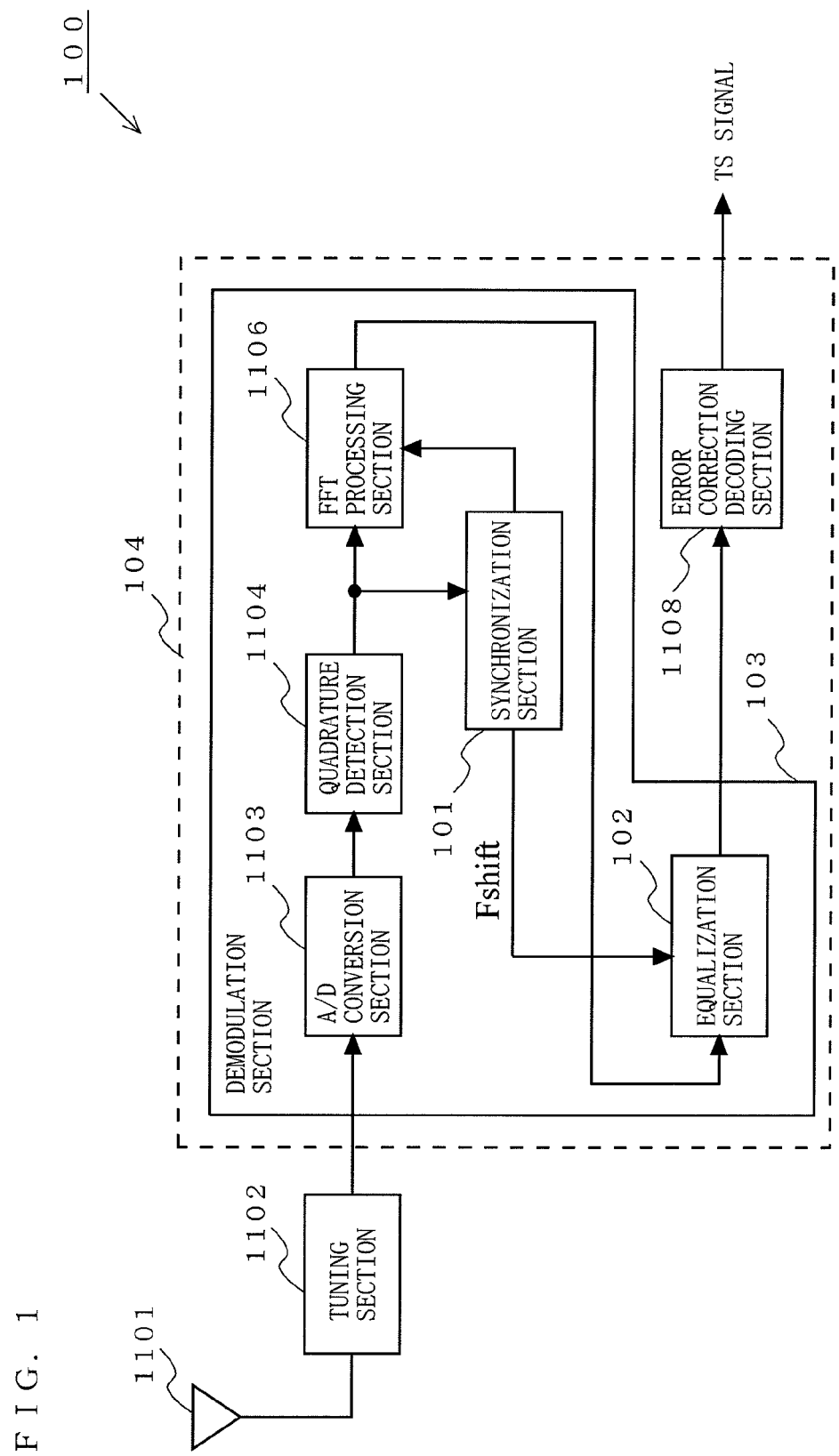
FIG. 1 shows a configuration of an OFDM receiving apparatus 100 according to a first embodiment of the present invention.

DESCRIPTION OF THE REFERENCE CHARACTERS 100, 200, 320, 360, 400, 430, 1100 OFDM receiving apparatus
101, 1105, 1501 synchronization section
102, 202, 322, 361, 401, 431, 1107, 1300, 1400 equalization section
103, 203, 323, 362, 432, 1111 demodulation section
111, 301, 311, 331, 371, 381, 391, 411, 1203, 1301 carrier interpolation section
104, 204, 324, 363, 433 integrated circuit
121, 302, 312, 421 interpolation filter
131 delay element
132 multiplier
133, 343, 422 passband shift section
134, 423 adder
141 phase rotation amount calculating section
142 complex rotation operation section
321, 1106 FFT processing section
341 complex delay element
342 complex multiplier
344 complex adder
351 complex phase rotation amount calculating section
352 complex rotation operation section
441 delay profile detection section
1000 OFDM transmitting apparatus
1001 error correction coding section
1002 mapping section
1003 interleaving section
1004 frame constructing section
1005 IFFT processing section
1006 guard interval adding section
1007 RF frequency conversion section
1108 error correction decoding section
1008, 1101 antenna
1102 tuning section
1103 A/D conversion section
1104 quadrature detection section
1201 SP demodulation section
1202 symbol interpolation section
1204 delay section
1205 complex division section
1401 amplitude variation detecting section
1402 switching section
1502 buffer memory
1503 control FFT
1504 control equalization section
1505 S/N calculating section
1506 time window control section

DETAILED DESCRIPTION OF THE INVENTION

Hereinafter, embodiments of the present invention will be described in detail with reference to the drawings.

(First Embodiment)

FIG. 1 shows a configuration of an OFDM receiving apparatus 100 according to a first embodiment of the present invention. The OFDM receiving apparatus 100 according to the first embodiment includes an antenna 1101, a tuning section 1102, a demodulation section 103, and an error correction decoding section 1108. The demodulation section 103 includes an A/D conversion section 1103, a quadrature detection section 1104, a synchronization section 101, an FFT processing section 1106, and an equalization section 102.

Figure 27:
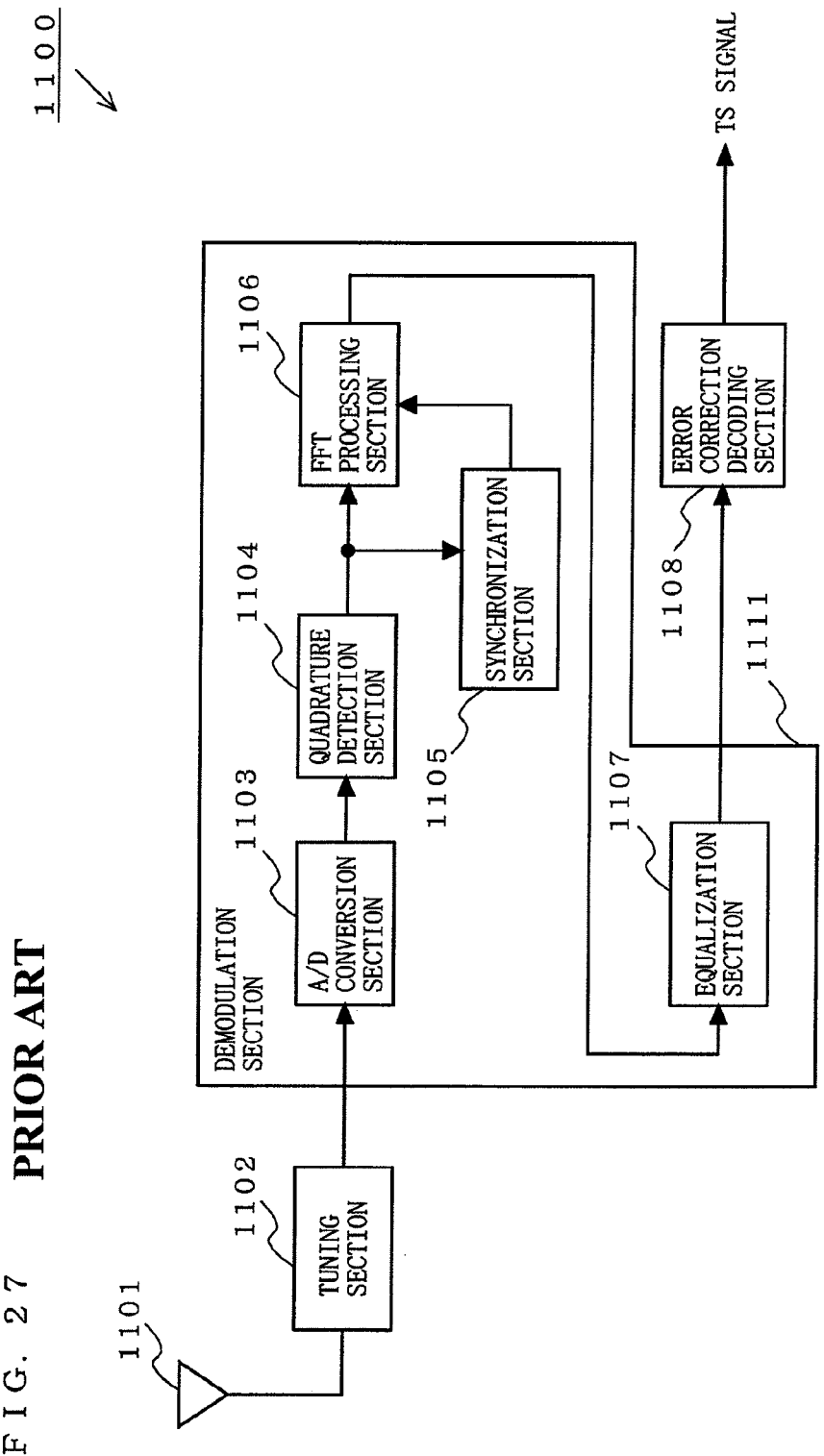
FIG. 27 shows a configuration of a conventional OFDM receiving apparatus 1100.
Figure 28:
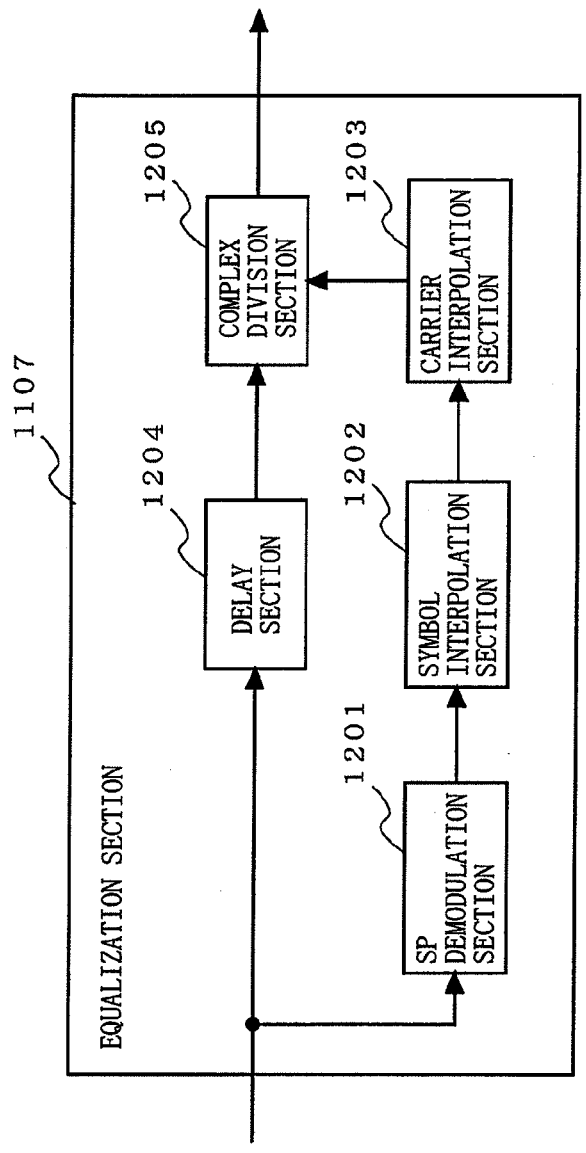
FIG. 28 shows in detail a configuration of an equalization section 1107.
Figure 29:
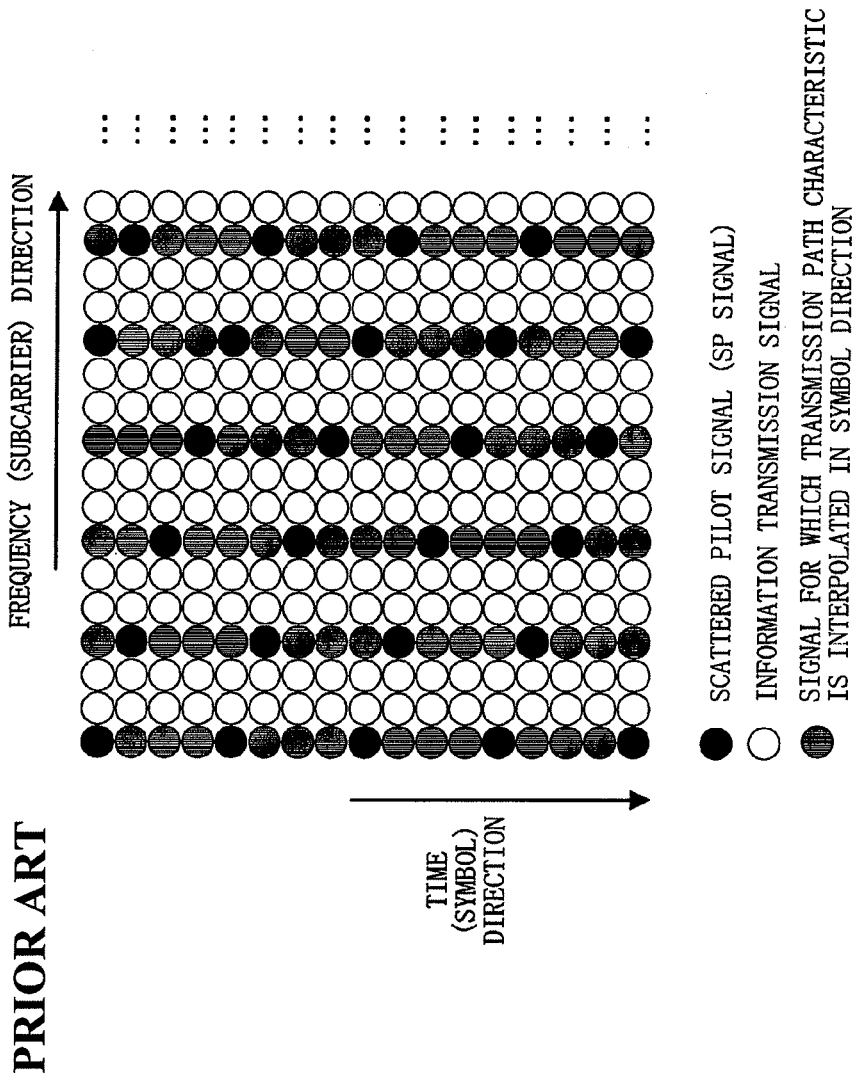
FIG. 29 is a diagram for describing interpolation operation performed by a symbol interpolation section 1202.
Figure 30:
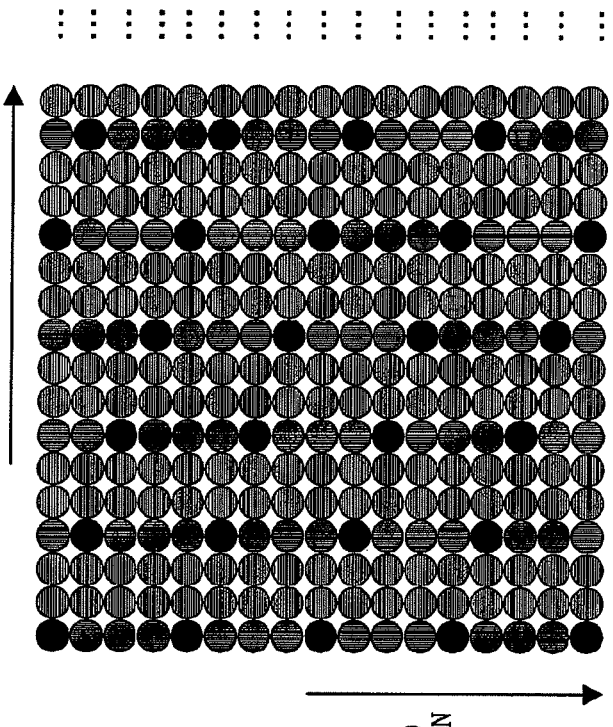
FIG. 30 is a diagram for describing interpolation operation performed by a carrier interpolation section 1203.

The OFDM receiving apparatus 100 is different from the conventional OFDM receiving apparatus 1100 shown in FIG. 27 with respect to configurations of the synchronization section 101 and the equalization section 102. It is noted that, since configurations other than the synchronization section 101 and the equalization section 102 are the same as in the conventional OFDM receiving apparatus 1100, these configurations will be denoted by the same reference numerals, and description thereof is omitted. Hereinafter, processing performed by the synchronization section 101 and the equalization section 102 will be described in detail. The equalization section 102 performs the 1-symbol equalization.

Figure 2:
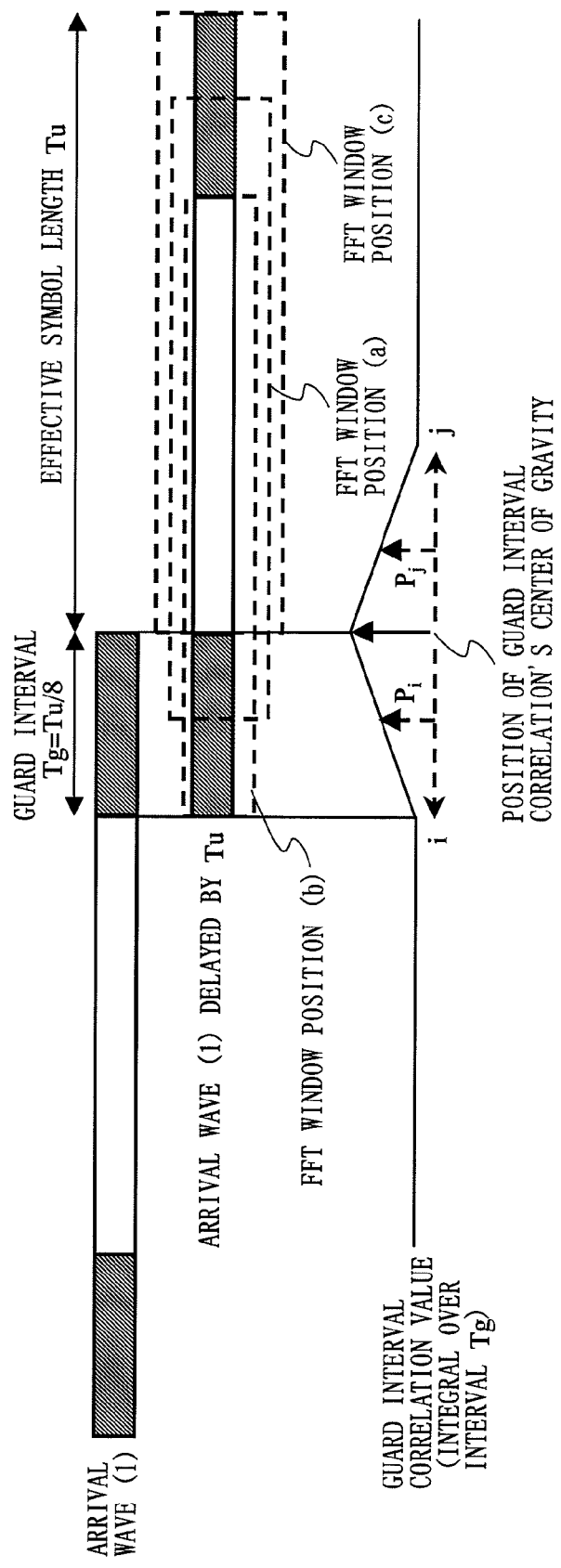
FIG. 2 is a diagram for describing a position of a guard interval correlation's center of gravity in a case where one wave arrives.

The synchronization section 101 specifies a position of a guard interval correlation's center of gravity based on a guard interval correlation value, and calculates a carrier-direction shift amount Fshift. FIG. 2 is a diagram for describing the position of the guard interval correlation's center of gravity. In FIG. 2, there is described as an example a case where one wave arrives. The guard interval correlation value is obtained by calculating a complex correlation value between an inputted time-domain signal and the time-domain signal delayed by an effective symbol length Tu, and integrating the complex correlation value over a guard interval Tg. The synchronization section 101 calculates the carrier-direction shift amount Fshift based on the following equation [1].

$$F\text{shift} = Tg/2 + (FFT \text{ window position} - \text{position of guard interval correlation's center of gravity}) \quad [1]$$

Here, as shown in FIG. 2, if the number of samples prior to a sample is represented by i and the number of samples after the sample is represented by j, and if a guard interval correlation value of each sample prior to the sample and a guard interval correlation value of each sample after the sample are represented by Pi and Pj, respectively, it is preferable that the position of the guard interval correlation's center of gravity is a position of a sample determined so as to minimize a difference between $\Sigma(i*Pi)$ and $\Sigma(j*Pj)$. That is, the center of gravity is a point at which a balance is achieved between powers or amplitudes within bins of the profiles and delay times within the bins. However, the definition of the position of the guard interval correlation's center of gravity is not limited thereto, and may be freely determined in accordance with a purpose while considering powers or amplitudes within bins of the profiles and delay times within the bins.

The carrier-direction shift amount Fshift calculated in the above manner is equal to a shift amount which is determined so as to increase energy of a transmission path frequency response included in the passband of the carrier interpolation filter of a carrier interpolation section 111.

From the equation [1], the carrier-direction shift amount Fshift for each case of FFT window positions (a) to (c) shown in FIG. 2 is obtained as follows.

Fshift=0 (FFT window position (a))
Fshift=Tg/2 (FFT window position (b))
Fshift=Tg/2 (FFT window position (c))

Figure 3:
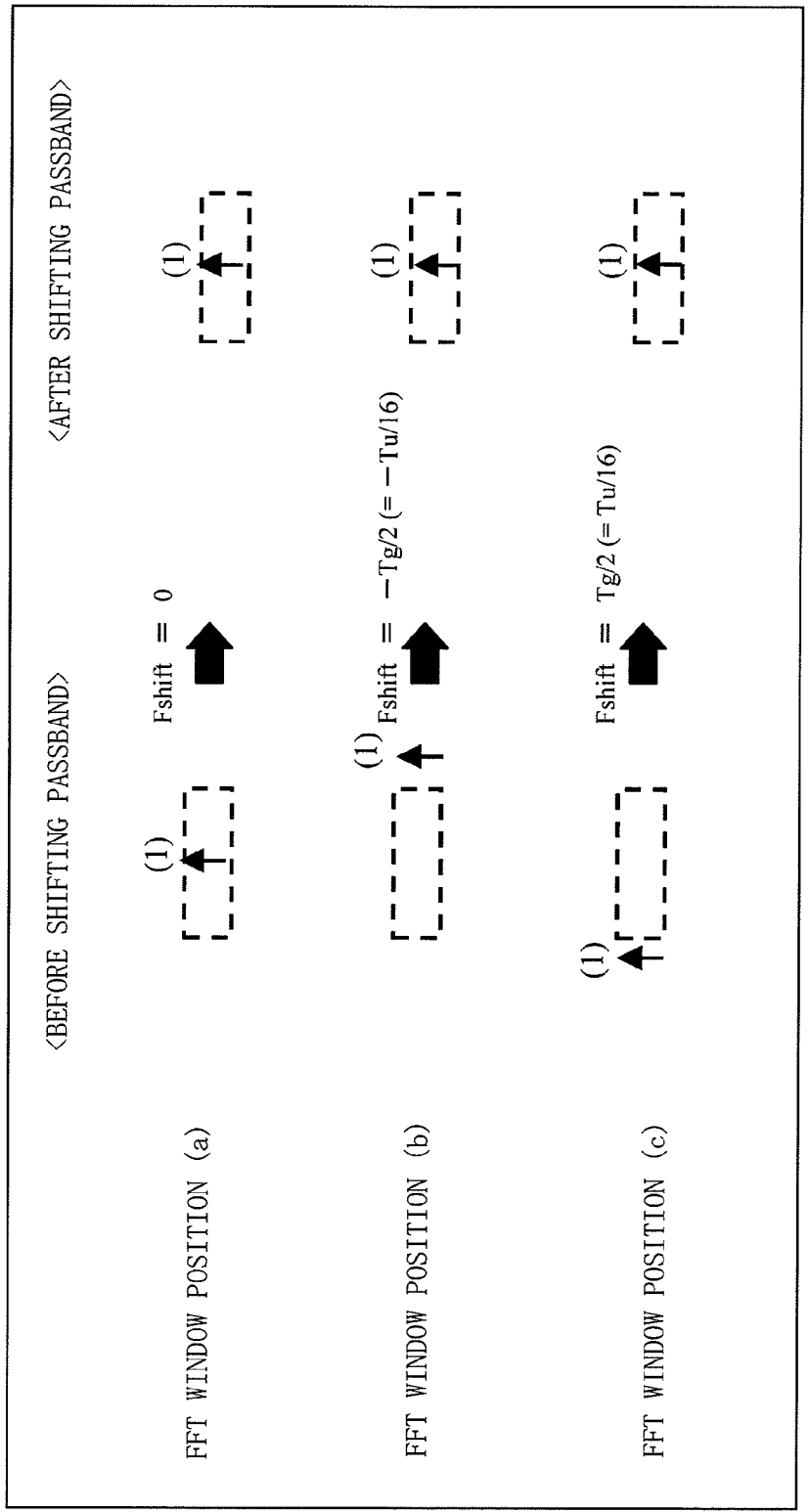
FIG. 3 shows an example of passband shift processing of a carrier interpolation section 111.

The equalization section 102 shifts the passband of the carrier interpolation filter of the carrier interpolation section 111 by the carrier-direction shift amount Fshift calculated by the synchronization section 101. This is shown in FIG. 3. This shift processing causes the delay profile to be kept in the center of the passband of the carrier interpolation filter, for any one of the FFT window positions.

Figure 4:
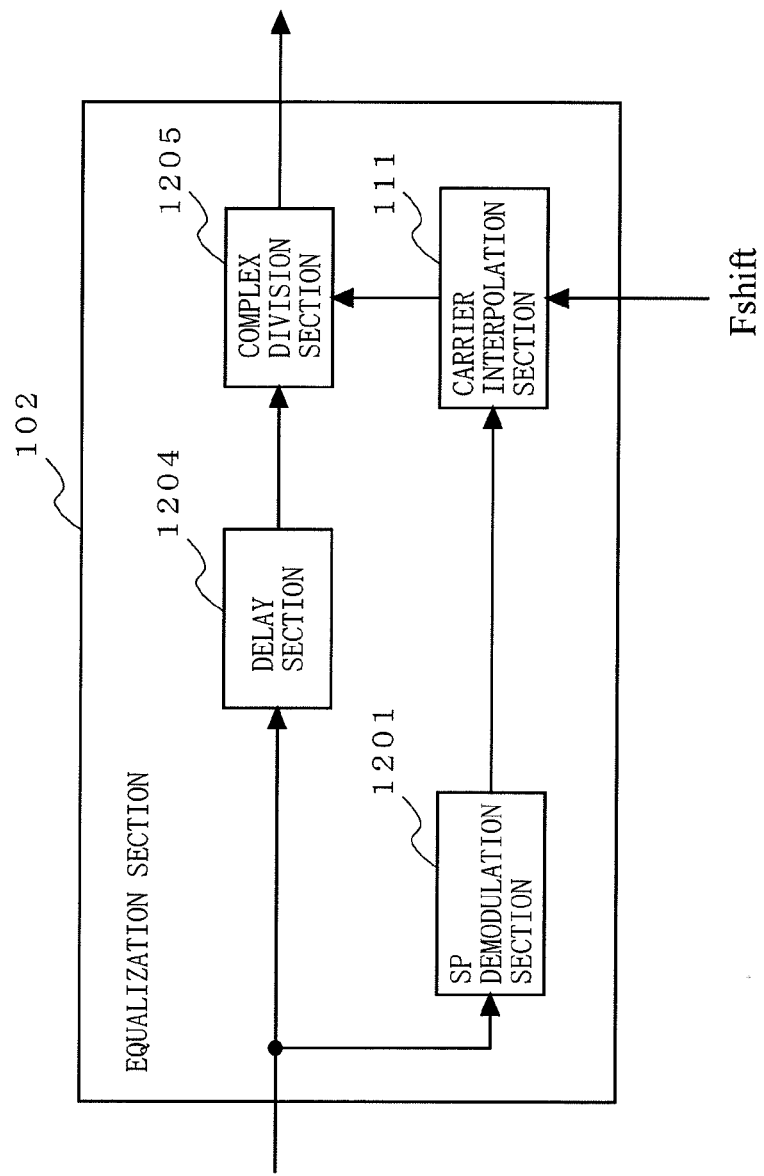
FIG. 4 shows in detail a configuration of an equalization section 102.
Figure 5:
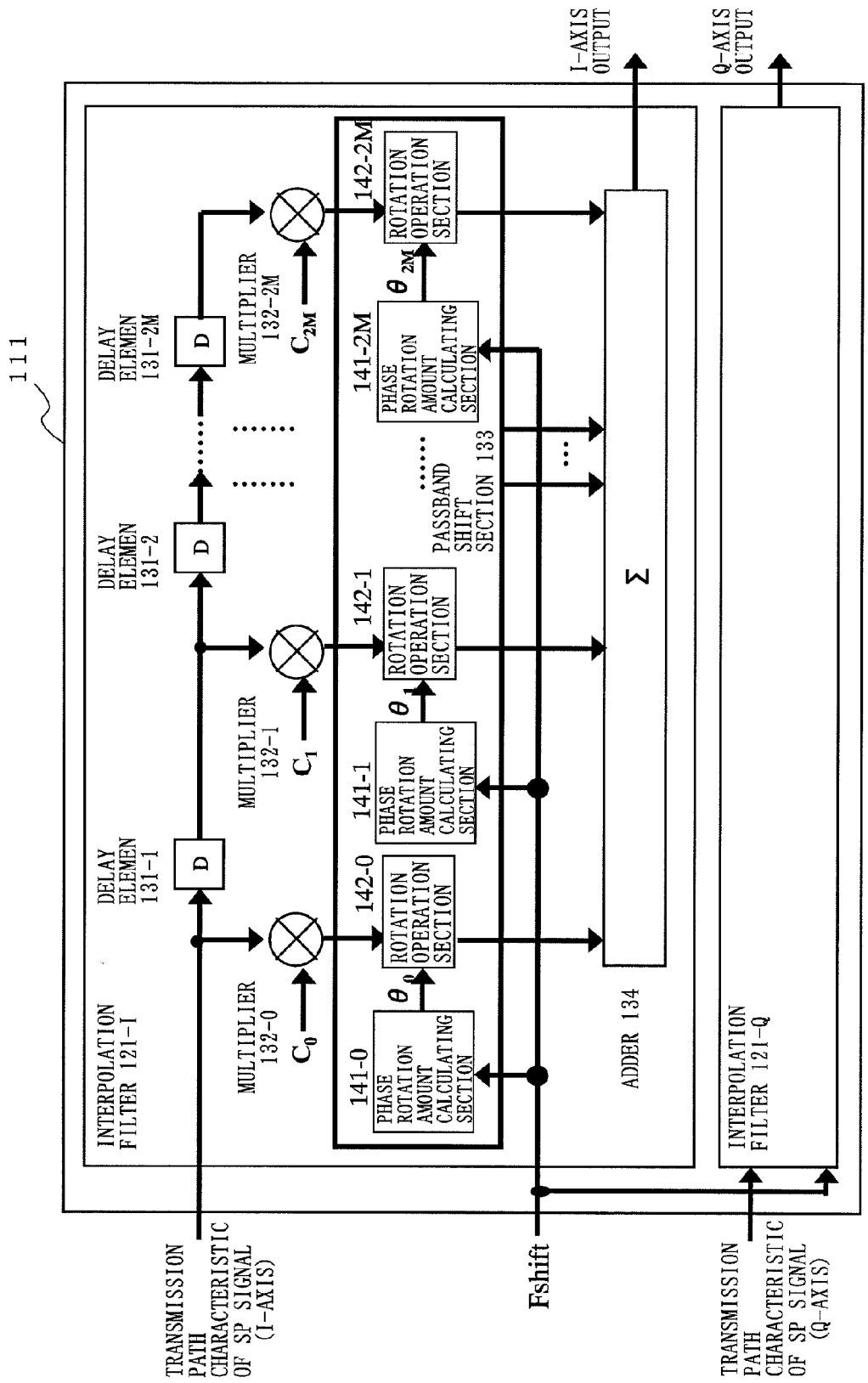
FIG. 5 shows in detail a configuration of a carrier interpolation section 111.
Figure 31:
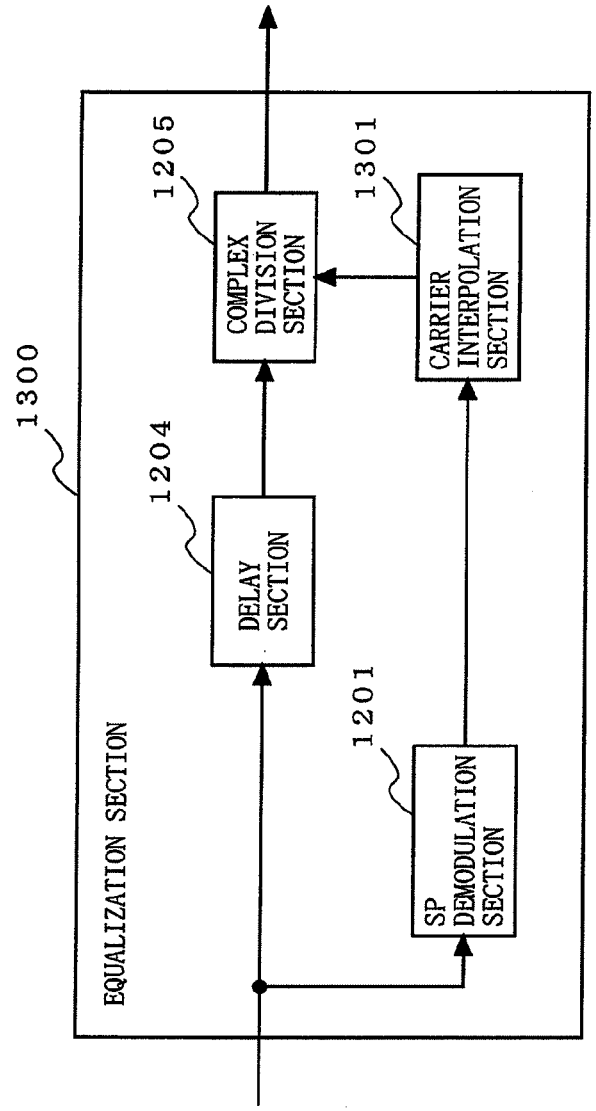
FIG. 31 shows in detail a configuration of an equalization section 1300.
Figure 32:
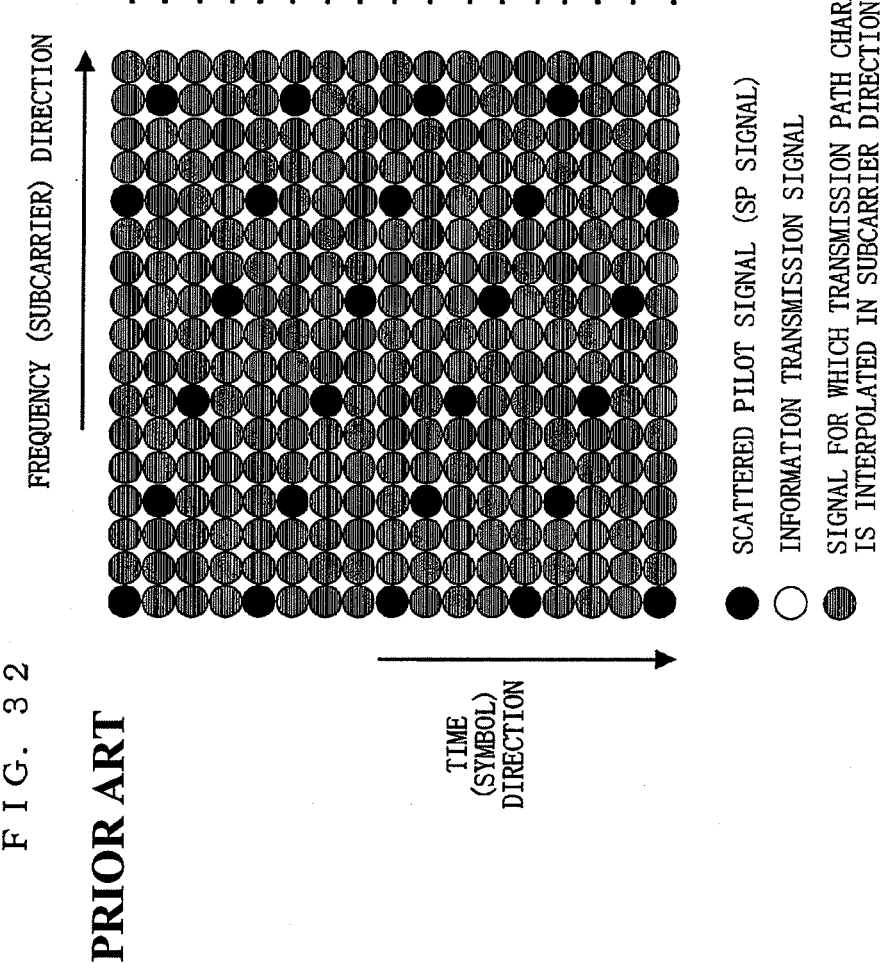
FIG. 32 is a diagram for describing interpolation operation performed by a carrier interpolation section 1301.

FIG. 4 shows in detail a configuration of the equalization section 102. The equalization section 102 is different from the conventional equalization section 1300 shown in FIG. 31 with respect to the carrier interpolation section 111. FIG. 5 shows in detail a configuration of the carrier interpolation section 111. The carrier interpolation section 111 includes an I-axis interpolation filter 121-I and a Q-axis interpolation filter 121-Q. The interpolation filter 121 includes 2M delay elements 131-1 to 131-2M, (2M+1) multipliers 132-0 to 132-2M, a passband shift section 133, and an adder 134. The passband shift section 133 includes (2M+1) phase rotation amount calculating sections 141-0 to 141-2M and (2M+1) rotation operation sections 142-0 to 142-2M. That is, the carrier interpolation section 111 is obtained by adding the passband shift section 133 to a FIR filter having (2M+1) taps (M is a natural number).

The phase rotation amount calculating sections 141-0 to 141-2M calculate phase rotation amounts θ0 to θ2M in accordance with the following equation [2]. Note that N is the number of samples of FFT.

$$\theta i = 2\pi (M-i) \cdot F\text{shift}/N \quad [2]$$

The rotation operation sections 142-0 to 142-2M perform rotation operations on outputs of the multipliers 132-0 to 132-2M by θ0 to θ2M, respectively. The other behaviors are the same as in a general FIR filter.

As described above, the OFDM receiving apparatus according to the first embodiment of the present invention makes it possible to keep a delay profile of an arrival wave within the passband of a carrier interpolation filter and perform transmission path estimation, without limiting a range of an FFT window position, even if the passband of the carrier interpolation filter for the 1-symbol equalization is narrower than a guard interval of an OFDM signal.

Particularly, by using the center of gravity which is a point at which balance is achieved between powers or amplitudes within bins of the profiles and delay times within the bins, the delay profile of an arrival wave can be kept within the passband of the carrier interpolation filter more accurately than in the invention of Patent Document 3 which considers only a spread of a delay time of a profile.

Figure 6:
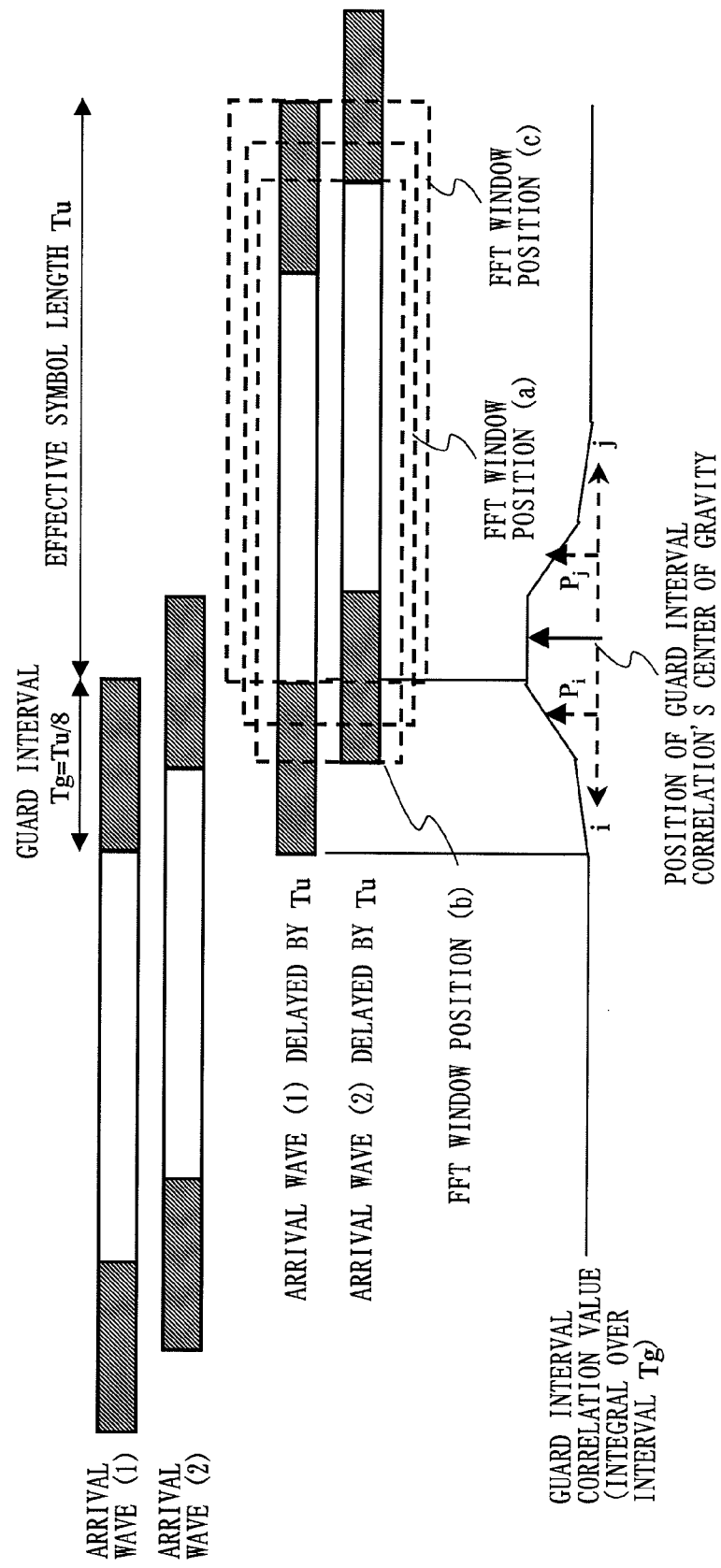
FIG. 6 is a diagram for describing a position of a guard interval correlation's center of gravity in a case where two waves arrive.

FIG. 6 is a diagram for describing the position of the guard interval correlation's center of gravity in a case where two waves arrive and the delay difference is Tg/2. The definition of the position of the guard interval correlation's center of gravity is as described above. From equation [1], the carrier-direction shift amount F shift for each case of FFT window positions (a) to (c) shown in FIG. 6 is obtained as follows.

Fshift=0 (FFT window position (a))
Fshift=-Tg/4 (FFT window position (b))
Fshift=Tg/4 (FFT window position (c))

Figure 7:
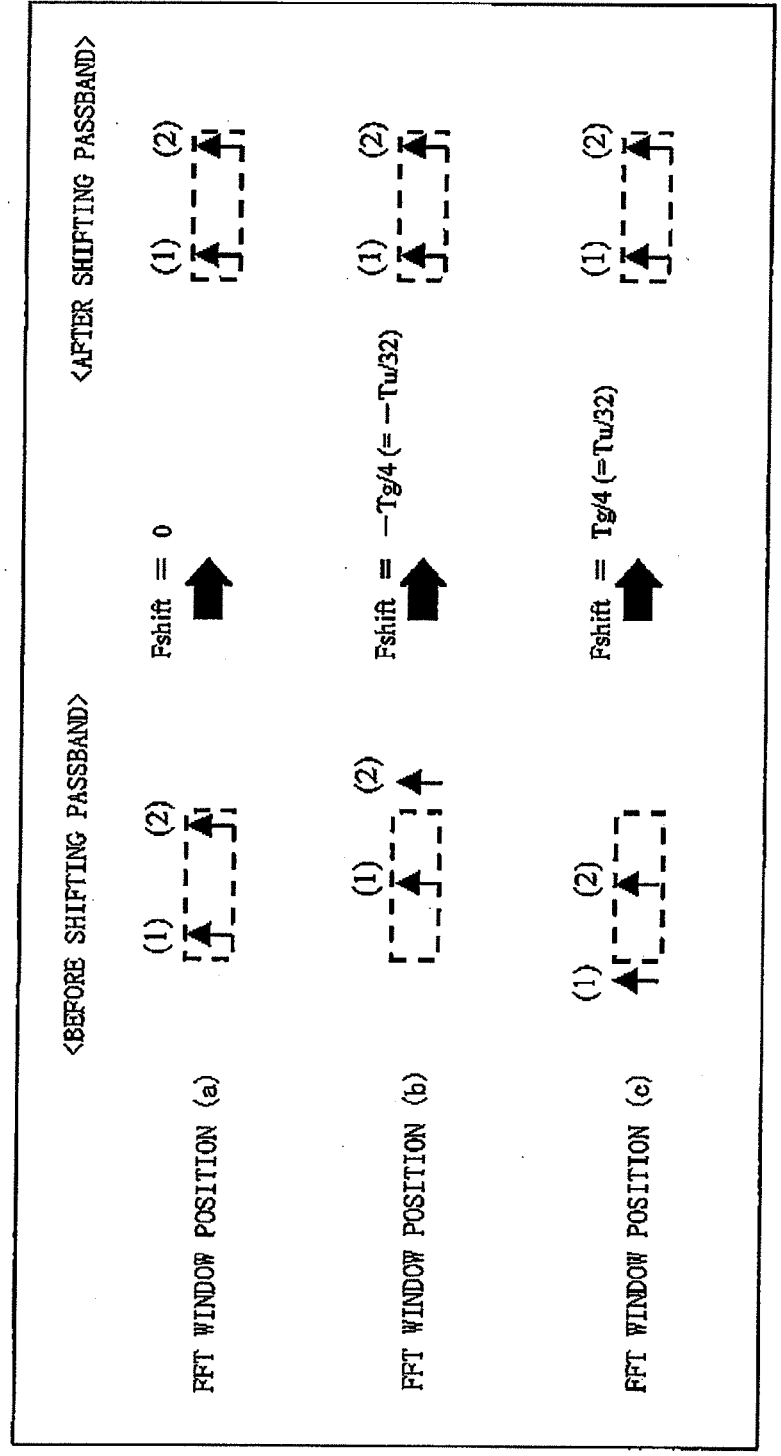
FIG. 7 shows another example of passband shift processing of the carrier interpolation section 111.

FIG. 7 shows how the passband of the carrier interpolation filter is shifted by the carrier-direction shift amount Fshift in a case where two waves arrive. The shift processing makes it possible to keep the delay profiles of the two arrival waves within the passband of a carrier interpolation filter and perform transmission path estimation, for any one of the FFT window positions.

(Second Embodiment)

Figure 8:
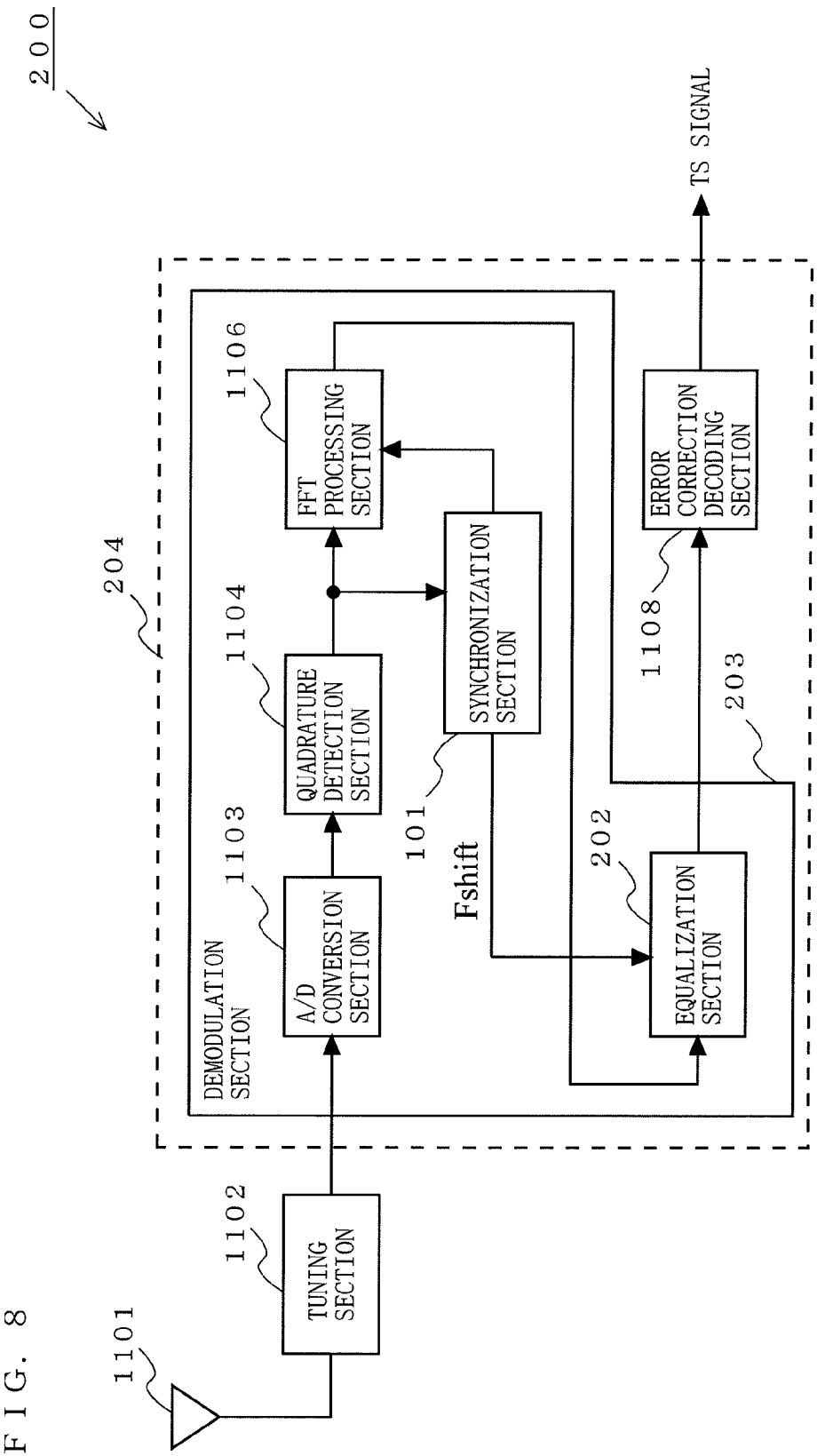
FIG. 8 shows a configuration of an OFDM receiving apparatus 200 according to a second embodiment of the present invention.

FIG. 8 shows a configuration of an OFDM receiving apparatus 200 according to a second embodiment of the present invention. The OFDM receiving apparatus 200 according to the second embodiment includes the antenna 1101, the tuning section 1102, a demodulation section 203, and the error correction decoding section 1108. The demodulation section 203 includes the A/D conversion section 1103, the quadrature detection section 1104, the synchronization section 101, the FFT processing section 1106, and an equalization section 202.

The OFDM receiving apparatus 200 is different from the OFDM receiving apparatus 100 according to the first embodiment shown in FIG. 1 with respect to a configuration of the equalization section 202. It is noted that, since configurations other than the equalization section 202 are the same as in the OFDM receiving apparatus 100, these configurations will be denoted by the same reference numerals, and description thereof is omitted. Hereinafter, processing performed by the equalization section 202 will be described in detail. The equalization section 202 performs the 1-symbol equalization or the 4-symbol equalization while switching therebetween.

Figure 9:
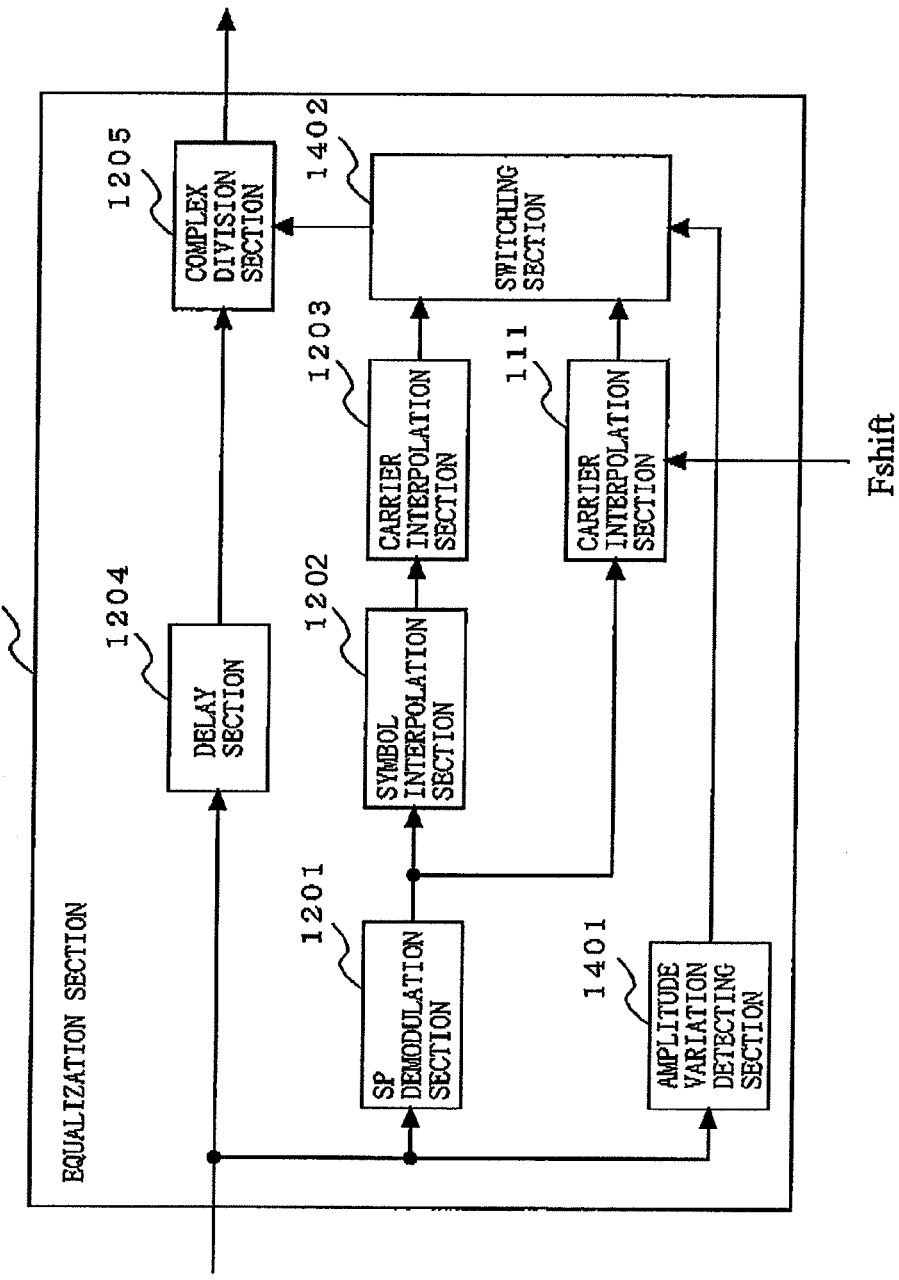
FIG. 9 shows in detail a configuration of an equalization section 202.
Figure 33:
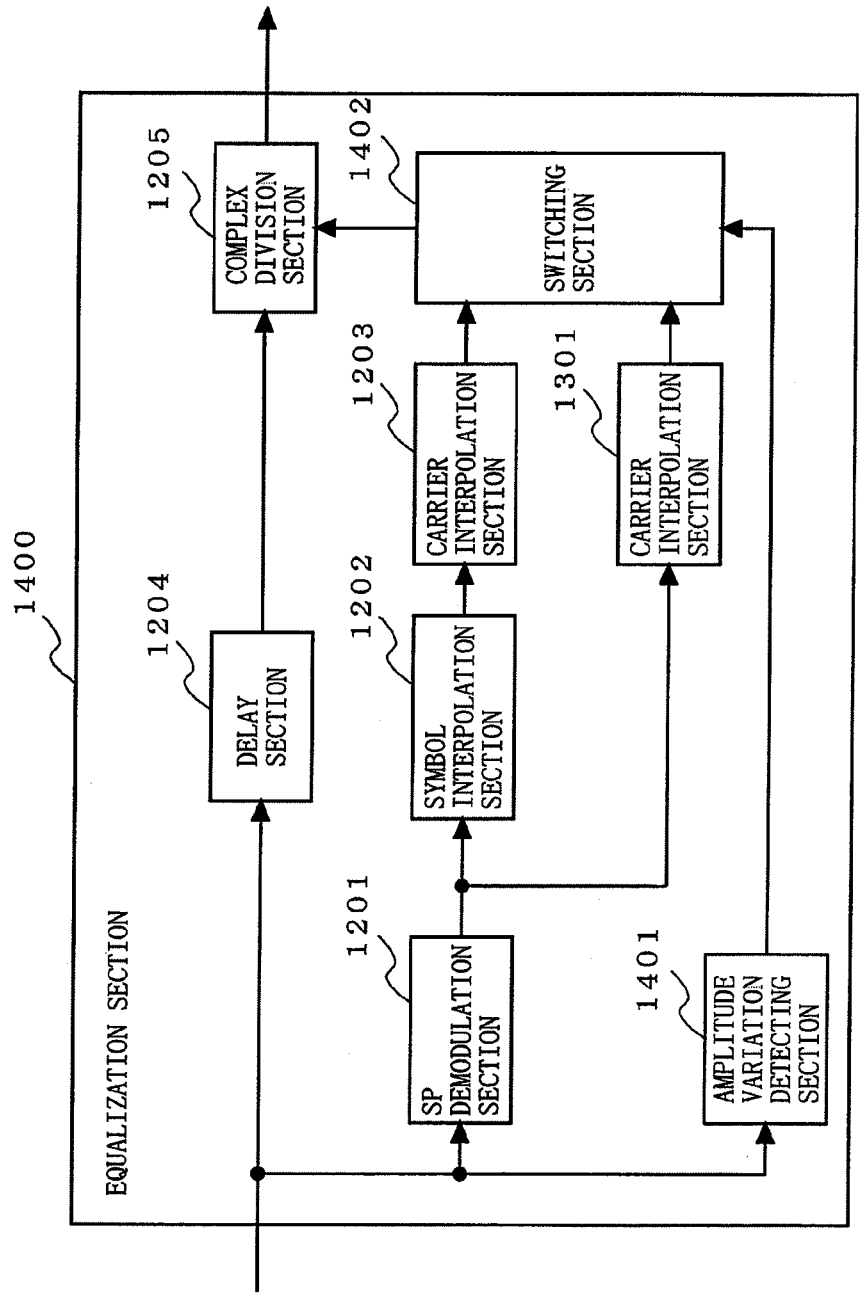
FIG. 33 shows in detail a configuration of an equalization section 1400.
Figure 34:
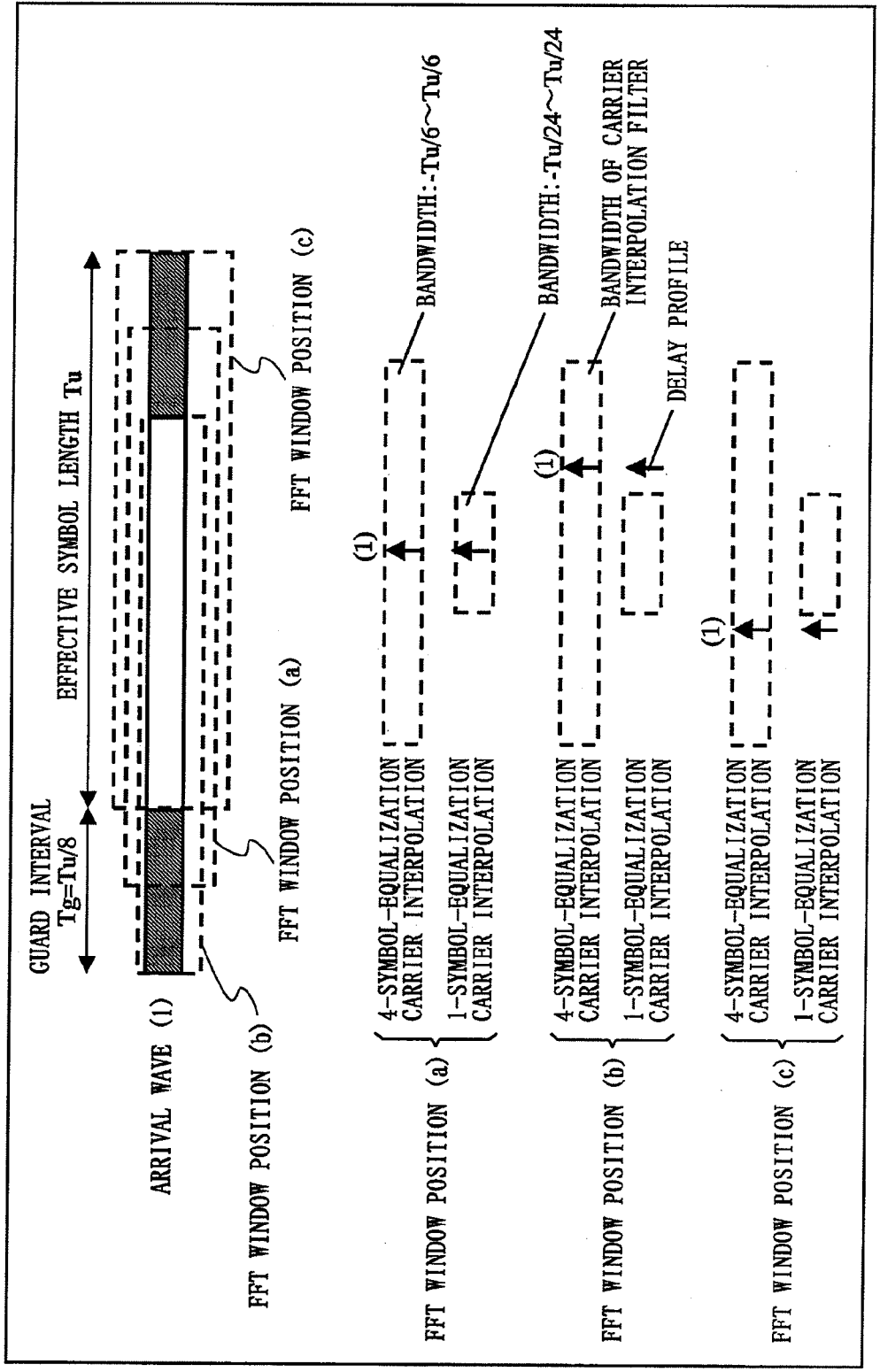
FIG. 34 shows an example of a relationship between: the FFT window position in a case where one wave arrives; and the delay profile with a passband of a carrier interpolation filter.
Figure 35:
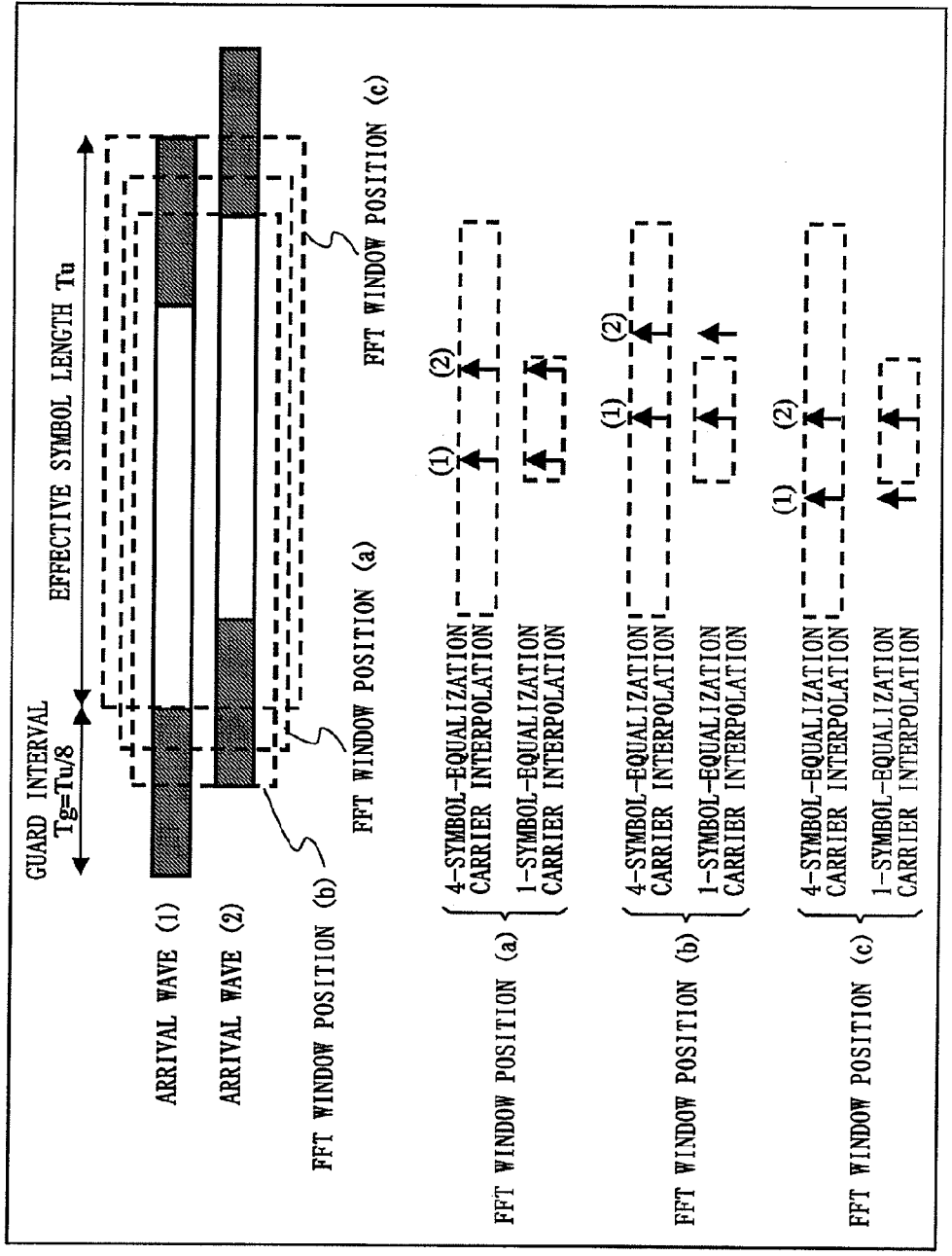
FIG. 35 shows an example of a relationship between: the FFT window position in a case where two waves arrive; and the delay profile with a passband of a carrier interpolation filter.
Figure 36:
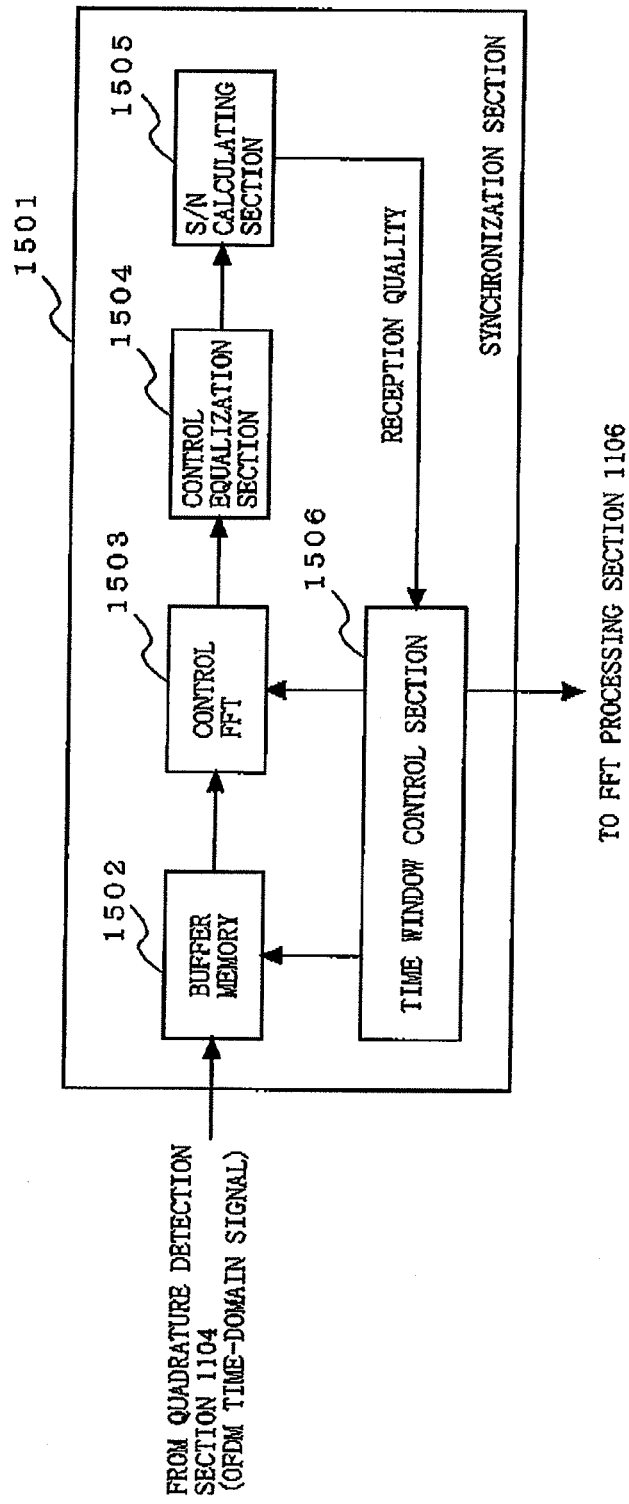
FIG. 36 shows in detail a configuration of a conventional synchronization section 1501.

FIG. 9 shows in detail a configuration of the equalization section 202. The equalization section 202 is different from the conventional equalization section 1400 shown in FIG. 33 with respect to the carrier interpolation section 111. The detailed configuration of the carrier interpolation section 111 is as shown in FIG. 5. As described in the first embodiment, when performing the 1-symbol equalization, the equalization section 202 shifts the passband of a carrier interpolation filter by the carrier-direction shift amount Fshift, which is calculated by the synchronization section 101.

As described above, the OFDM receiving apparatus according to the second embodiment of the present invention makes it possible to keep a delay profile of an arrival wave within the passband of a carrier interpolation filter and perform transmission path estimation, without limiting a range of an FFT window position, even if switching is performed between the 1-symbol equalization and the 4-symbol equalization and then the 1-symbol equalization is selected.

Figure 10:
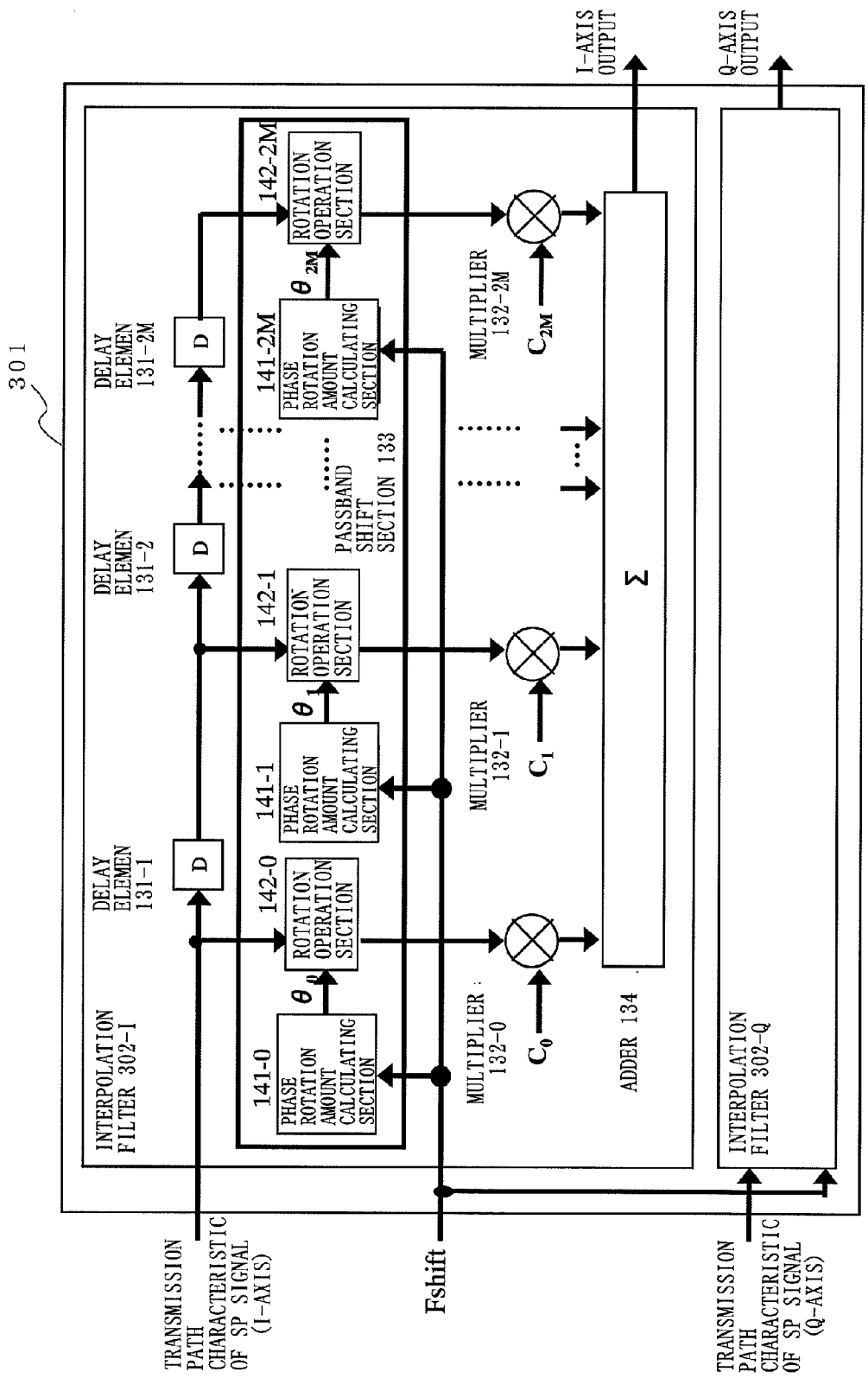
FIG. 10 shows in detail a configuration of a carrier interpolation section 301.
Figure 11:
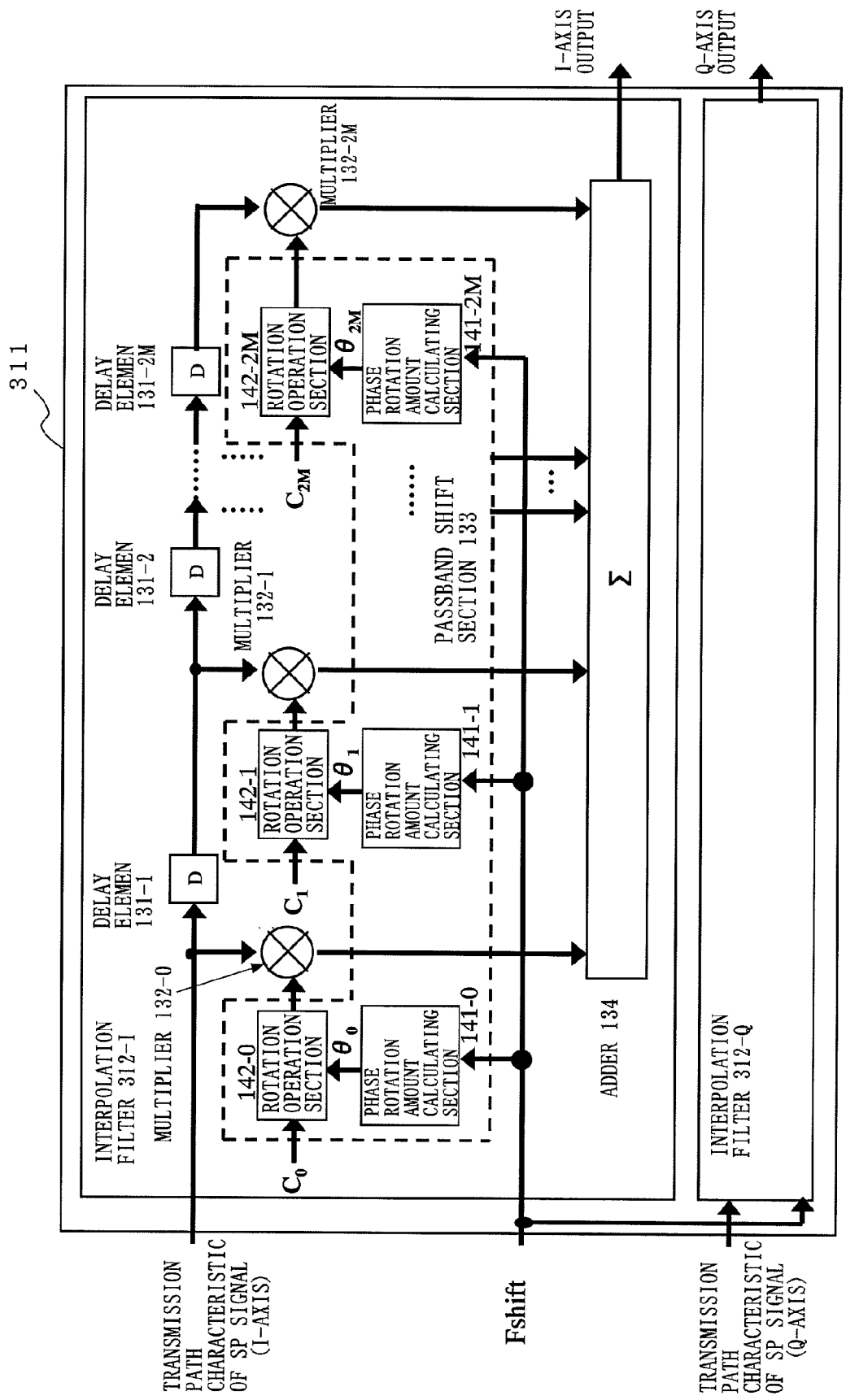
FIG. 11 shows in detail a configuration of a carrier interpolation section 311.

In the first and the second embodiments described above, the passband shift section 133 in the carrier interpolation section 111 is provided at a stage subsequent to the multipliers 132-0 to 132-2M (FIG. 5). However, the passband shift section 133 may be provided at a stage precedent to the multipliers 132-0 to 132-2M, as in the carrier interpolation section 301 shown in FIG. 10. Alternatively, the passband shift section 133 may be provided between coefficients C0 to C2M and the multipliers 132-0 to 132-2M, as in a carrier interpolation section 311 shown in FIG. 11.

(Third Embodiment)

Figure 12:
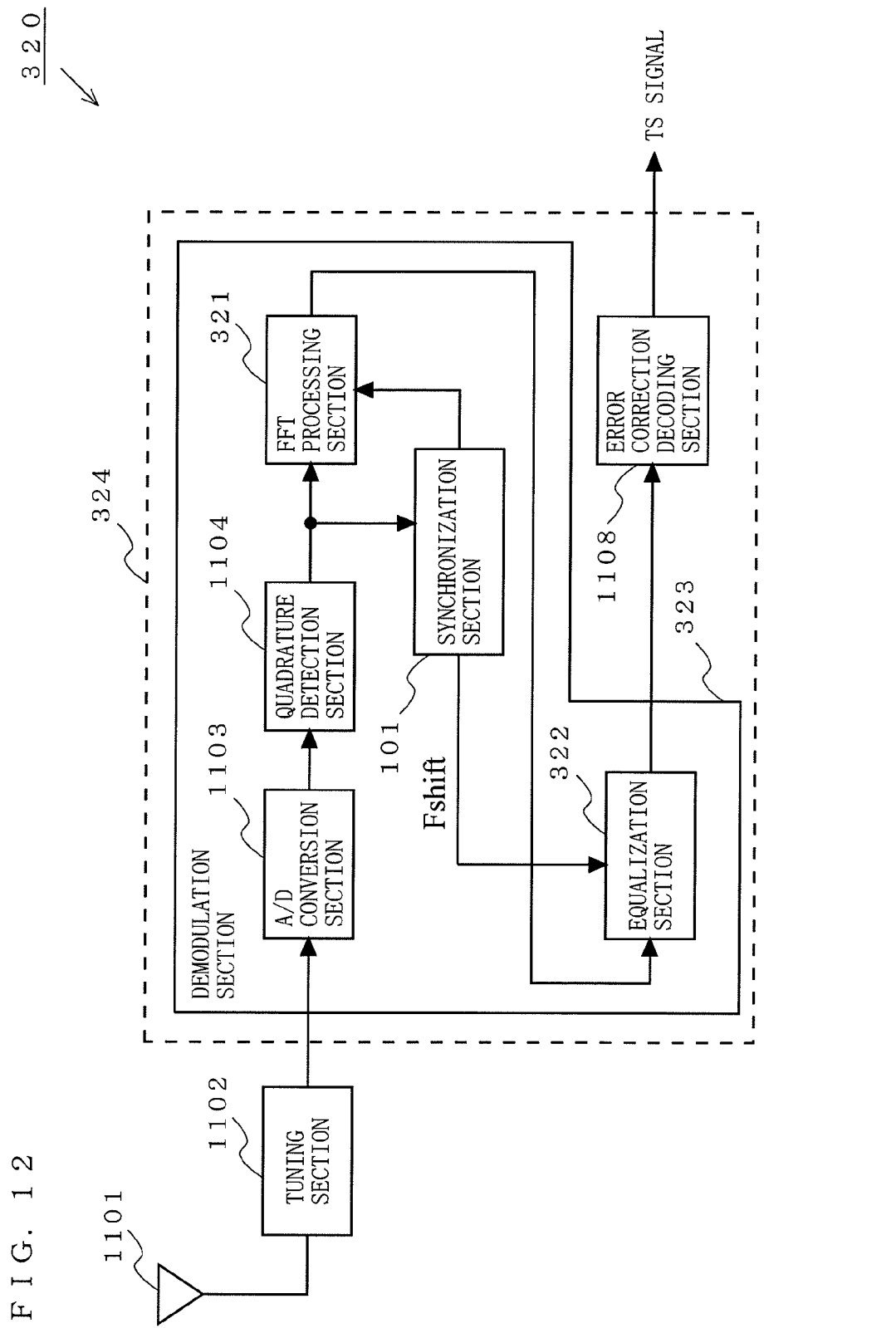
FIG. 12 shows a configuration of an OFDM receiving apparatus 320 according to a third embodiment of the present invention.

FIG. 12 shows a configuration of an OFDM receiving apparatus 320 according to a third embodiment of the present invention. The OFDM receiving apparatus 320 according to the third embodiment includes the antenna 1101, the tuning section 1102, a demodulation section 323, and the error correction decoding section 1108. The demodulation section 323 includes the A/D conversion section 1103, the quadrature detection section 1104, the synchronization section 101, an FFT processing section 321, and an equalization section 322.

The OFDM receiving apparatus 320 is different from the OFDM receiving apparatus 100 according to the first embodiment shown in FIG. 1 with respect to configurations of the FFT processing section 321 and the equalization section 322. It is noted that, since configurations other than the FFT processing section 321 and the equalization section 322 are the same as in the OFDM receiving apparatus 100, these configurations will be denoted by the same reference numerals, and description thereof is omitted. Hereinafter, processing performed by the FFT processing section 321 and the equalization section 322 will be described in detail. The equalization section 322 performs the 1-symbol equalization.

The FFT processing section 1106 described in the first and the second embodiments performs band shift processing by $-Tg/2$ at the output stage, and the carrier interpolation filter is formed by a real filter in which the I-axis and the Q-axis are independent of each other. However, the FFT processing section 321 in the third embodiment does not perform band shift processing by $-Tg/2$ at the output stage, and the carrier interpolation filter is formed by a complex filter.

Figure 13:
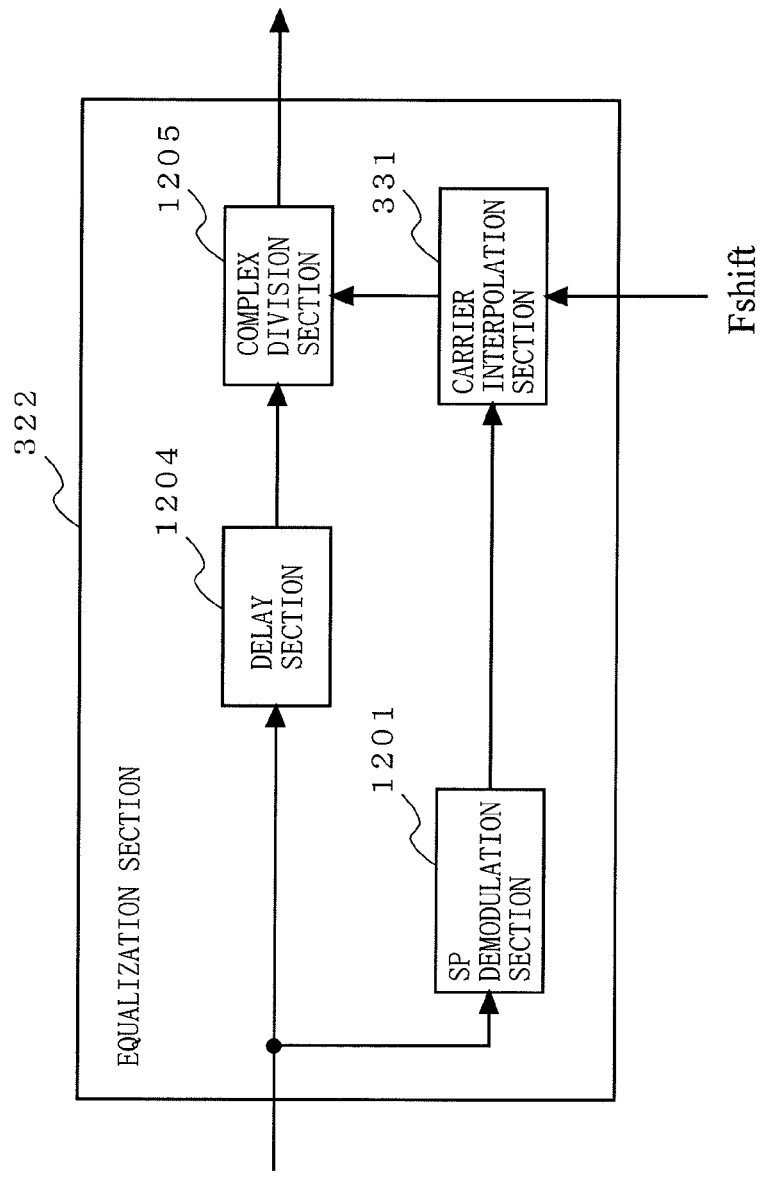
FIG. 13 shows in detail a configuration of an equalization section 322.
Figure 14:
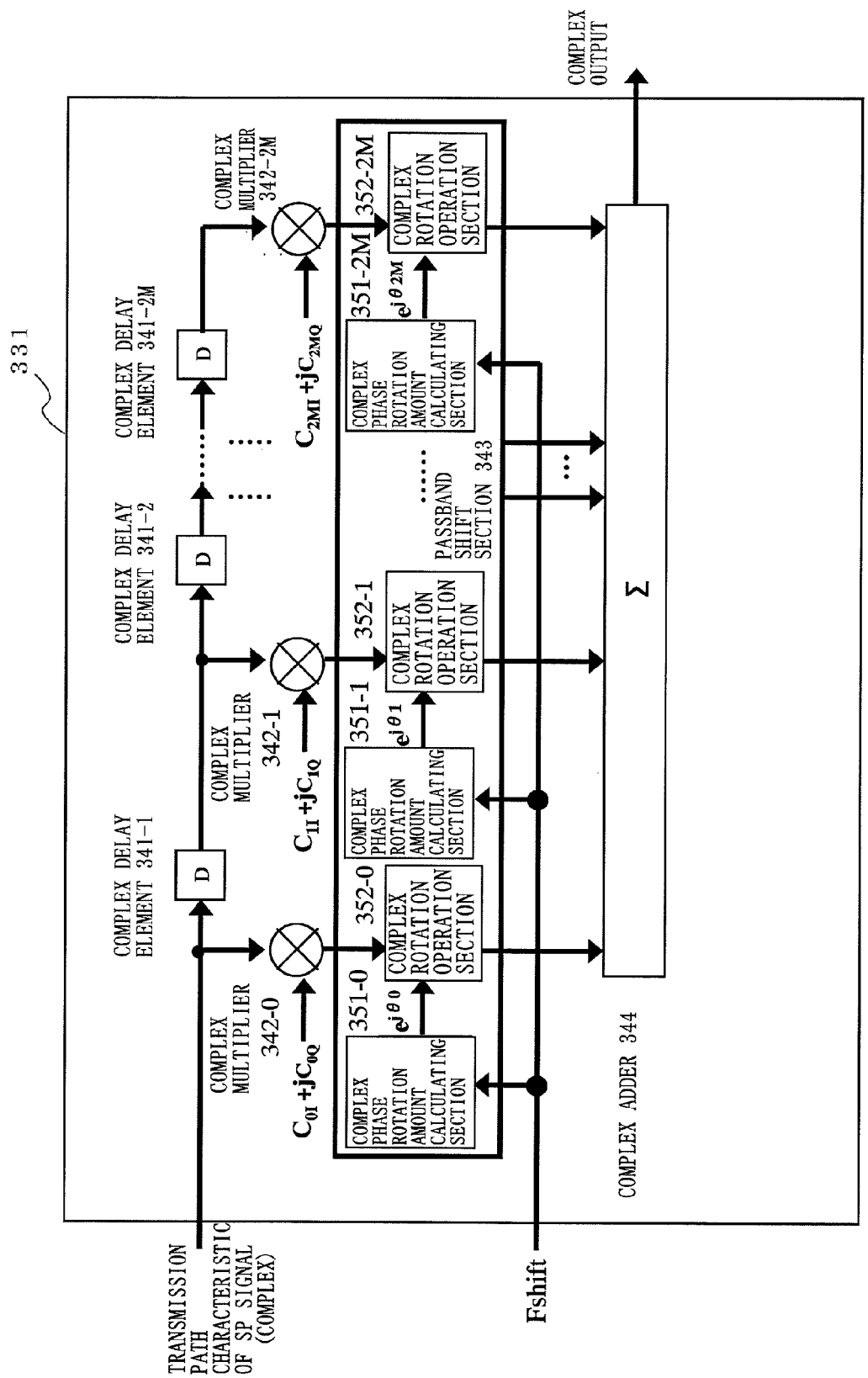
FIG. 14 shows in detail a configuration of the carrier interpolation section 331.

FIG. 13 shows in detail a configuration of the equalization section 322. The equalization section 322 is different from the equalization section 102 of the first embodiment shown in FIG. 4 with respect to a carrier interpolation section 331. FIG. 14 shows in detail a configuration of the carrier interpolation section 331. The carrier interpolation section 331 includes 2M complex delay elements 341-1 to 341-2M, (2M+1) complex multipliers 342-0 to 342-2M, a passband shift section 343, and a complex adder 344. The passband shift section 343 includes (2M+1) complex phase rotation amount calculating sections 351-0 to 351-2M, and (2M+1) complex rotation operation sections 352-0 to 352-2M. That is, the carrier interpolation section 331 is obtained by adding the passband shift section 343 to a complex FIR filter having (2M+1) taps. Operation of the carrier interpolation section 331 is the same as that of the carrier interpolation section 111, except that all the processes are performed by using complex numbers.

(Fourth Embodiment)

Figure 15:
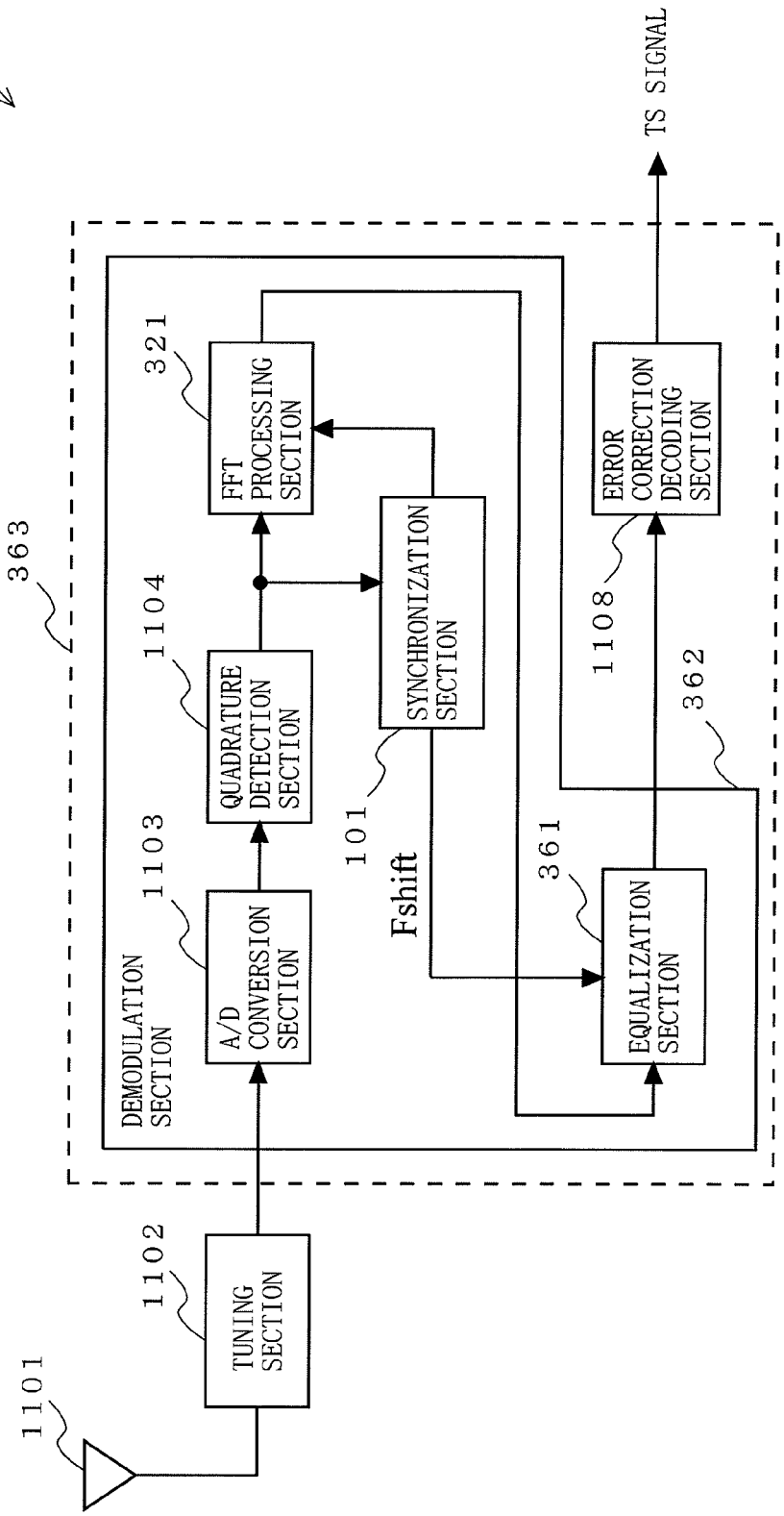
FIG. 15 shows a configuration of an OFDM receiving apparatus 360 according to a fourth embodiment of the present invention.

FIG. 15 shows a configuration of an OFDM receiving apparatus 360 according to a fourth embodiment of the present invention. The OFDM receiving apparatus 360 according to the fourth embodiment includes the antenna 1101, the tuning section 1102, a demodulation section 362, and the error correction decoding section 1108. The demodulation section 362 includes the A/D conversion section 1103, the quadrature detection section 1104, the synchronization section 101, the FFT processing section 321, and an equalization section 361.

The OFDM receiving apparatus 360 is different from the OFDM receiving apparatus 320 according to the third embodiment shown in FIG. 12 with respect to a configuration of the equalization section 361. It is noted that, since configurations other than the equalization section 361 are the same as in the OFDM receiving apparatus 320, these configurations will be denoted by the same reference numerals, and description thereof is omitted. Hereinafter, processing performed by the equalization section 361 will be described in detail. The equalization section 361 performs the 1-symbol equalization or the 4-symbol equalization while switching therebetween.

Figure 16:
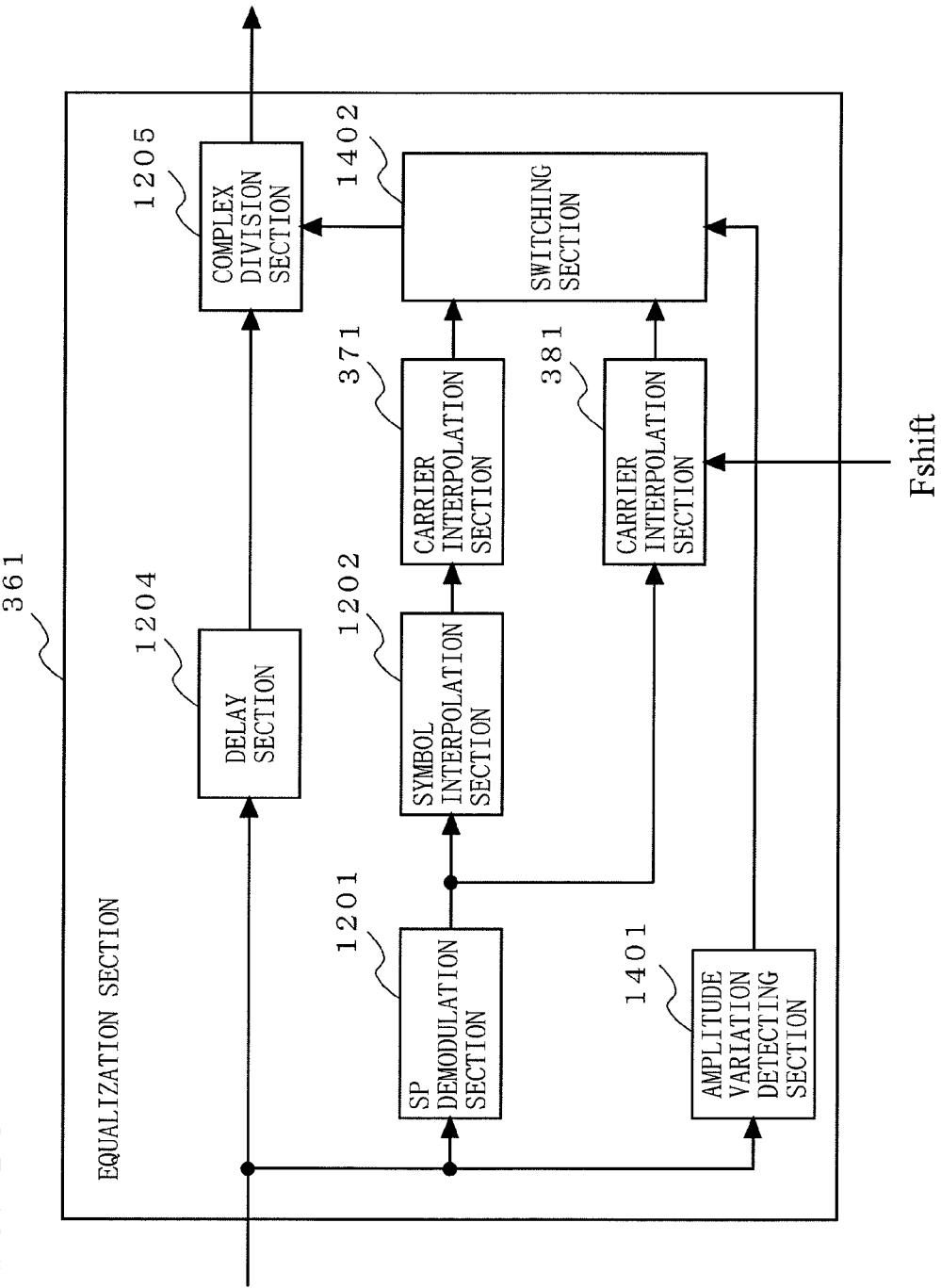
FIG. 16 shows in detail a configuration of an equalization section 361.
Figure 17:
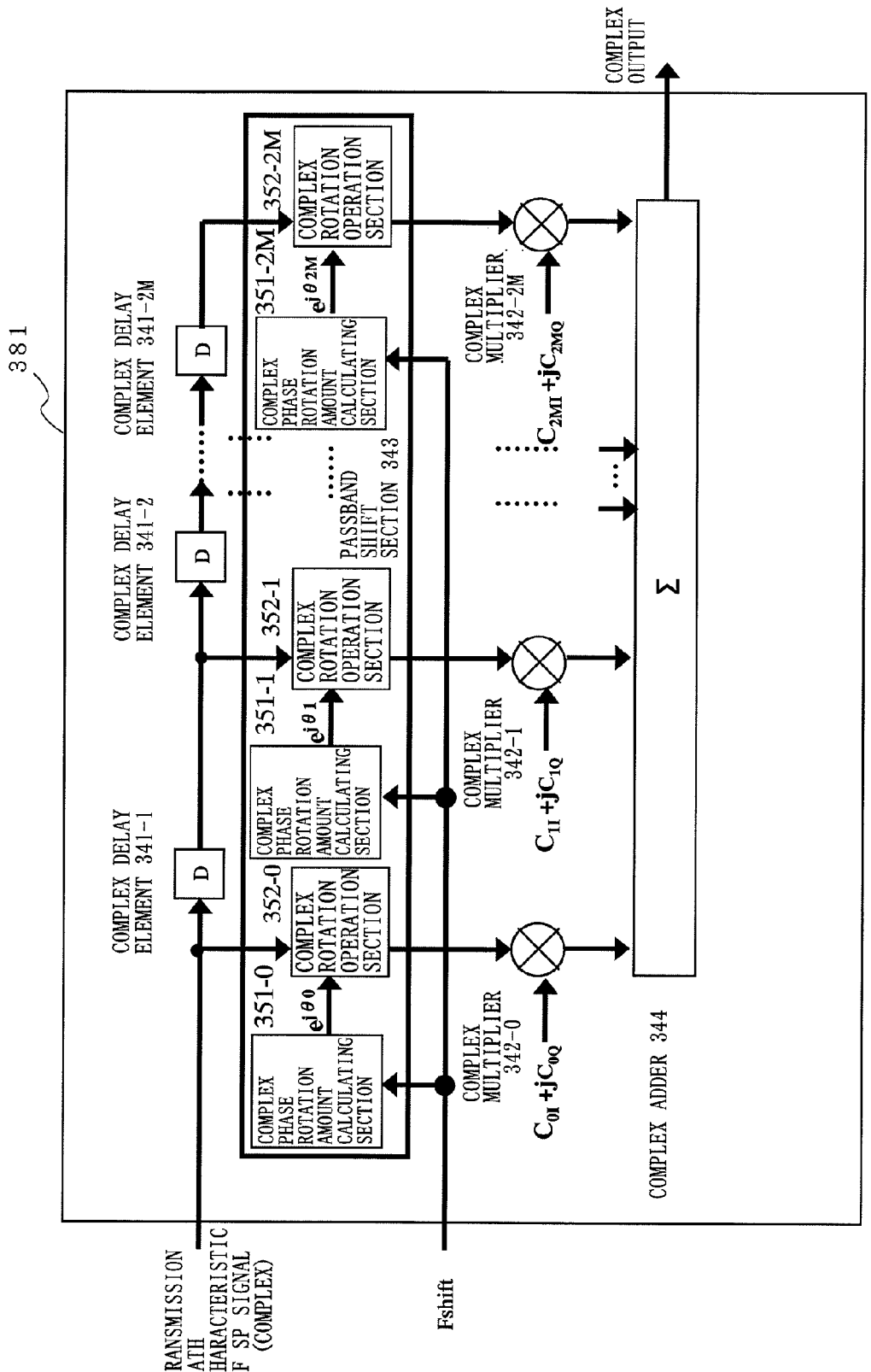
FIG. 17 shows in detail a configuration of a carrier interpolation section 381.

FIG. 16 shows in detail a configuration of the equalization section 361. The equalization section 361 is different from the equalization section 202 according to the second embodiment shown in FIG. 9 with respect to a carrier interpolation section 371 for the 4-symbol equalization and a carrier interpolation section 381 for the 1-symbol equalization. Operation of the carrier interpolation section 371 for the 4-symbol equalization is the same as that of the carrier interpolation section 1203, except that all processing is performed by using complex numbers. In the carrier interpolation section 381 for the 1-symbol equalization, the passband shift section 343 is provided at a stage precedent to the complex multipliers 342-0 to 342-2M, as shown in FIG. 17. However, the passband shift section 343 may be provided between coefficients C0I+jC0Q to C2MI+jC2MQ and the complex multipliers 342-0 to 342-2M, as in a carrier interpolation section 391 shown in FIG. 18.

(Fifth Embodiment)

Figure 19:
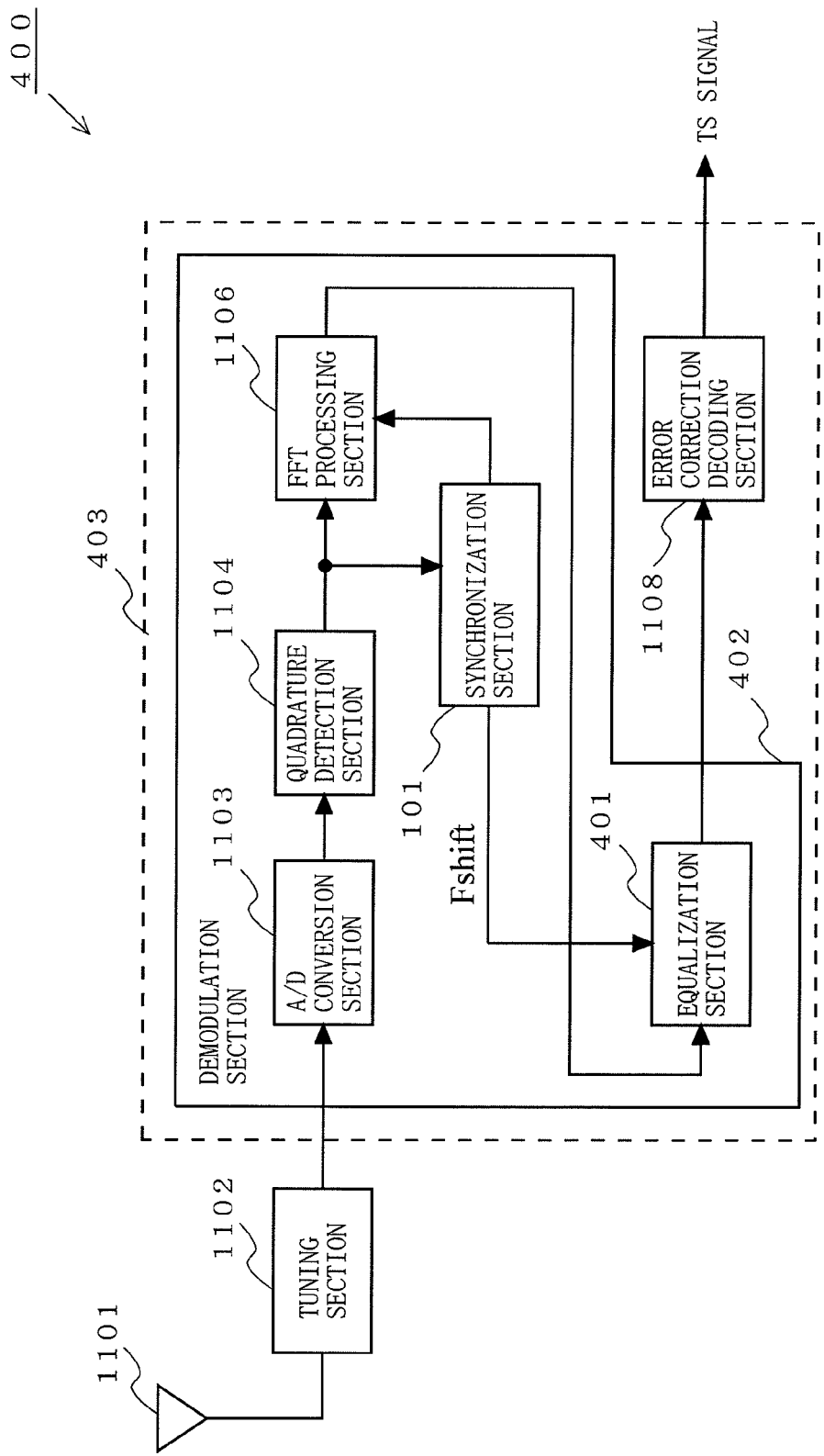
FIG. 19 shows a configuration of an OFDM receiving apparatus 400 according to a fifth embodiment of the present invention.

FIG. 19 shows a configuration of an OFDM receiving apparatus 400 according to a fifth embodiment of the present invention. The OFDM receiving apparatus 400 according to the fifth embodiment includes the antenna 1101, the tuning section 1102, a demodulation section 402, and the error correction decoding section 1108. The demodulation section 402 includes the A/D conversion section 1103, the quadrature detection section 1104, the synchronization section 101, the FFT processing section 1106, and an equalization section 401.

The OFDM receiving apparatus 400 shifts the passband if the passband of a carrier interpolation filter for the 4-symbol equalization is narrower than the guard interval. The OFDM receiving apparatus 400 is different from the OFDM receiving apparatus 100 according to the first embodiment shown in FIG. 1 with respect to a configuration of the equalization section 401. It is noted that, since configurations other than the equalization section 401 are the same as in the OFDM receiving apparatus 100, these configurations will be denoted by the same reference numerals, and description thereof is omitted. Hereinafter, processing performed by the equalization section 401 will be described in detail. The equalization section 401 performs the 4-symbol equalization.

Figure 20:
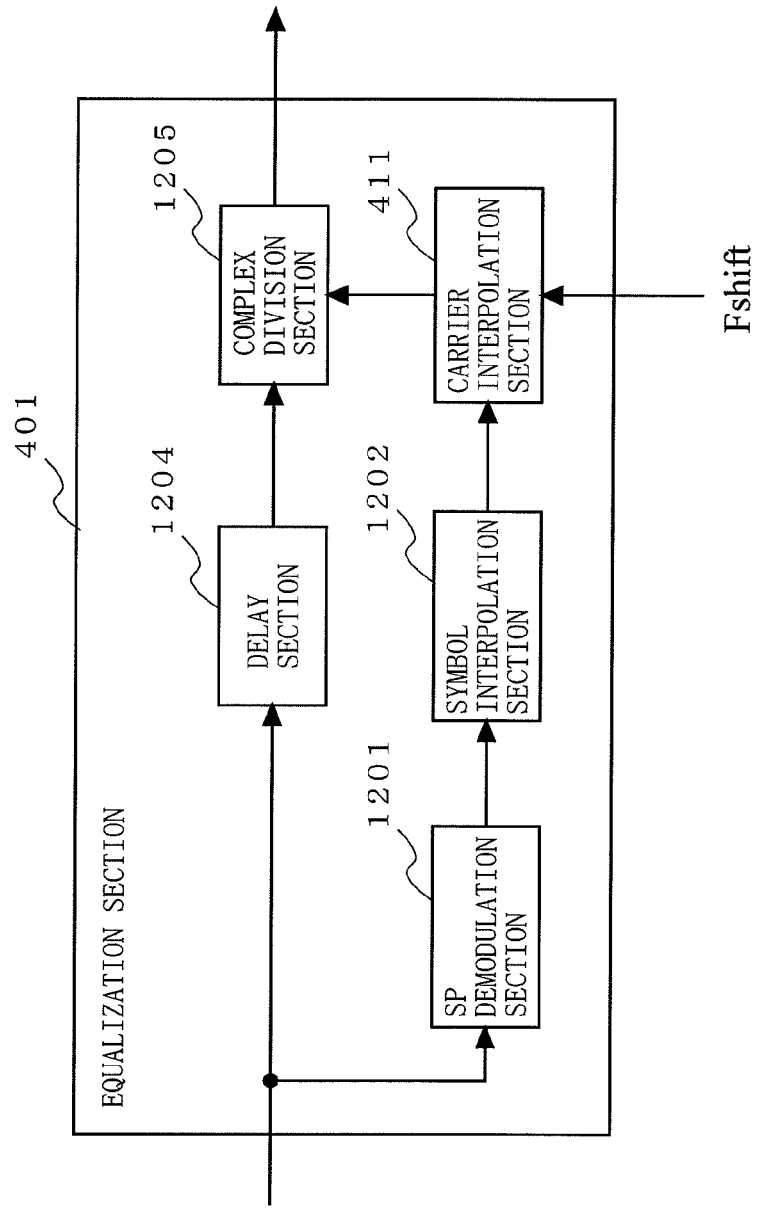
FIG. 20 shows in detail a configuration of an equalization section 401.
Figure 21:
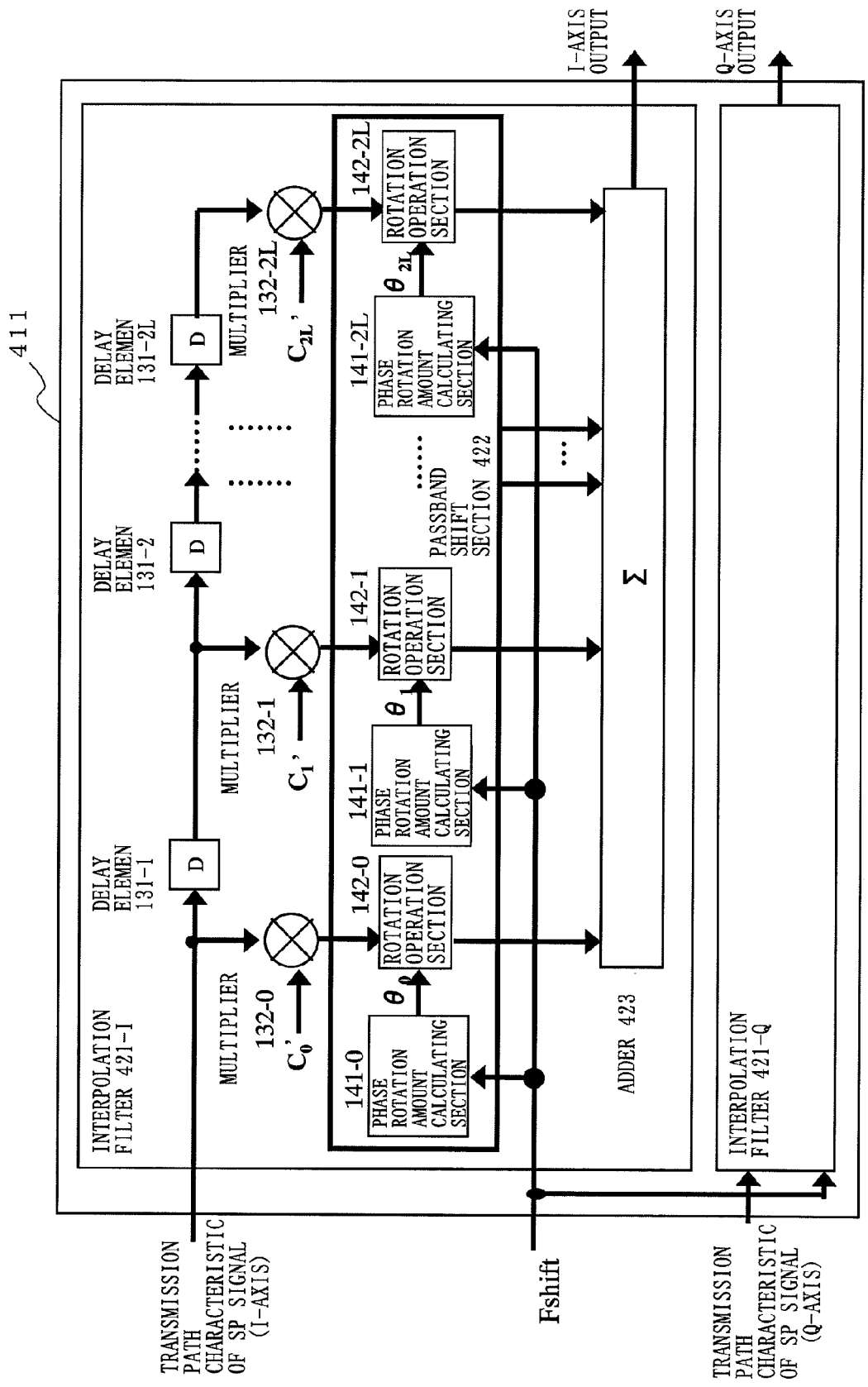
FIG. 21 shows in detail a configuration of a carrier interpolation section 411.

FIG. 20 shows in detail a configuration of the equalization section 401. The equalization section 401 is different from the equalization section 102 of the first embodiment shown in FIG. 4 with respect to a carrier interpolation section 411 and the symbol interpolation section 1202. FIG. 21 shows in detail a configuration of the carrier interpolation section 411. The carrier interpolation section 411 is different from the carrier interpolation section 111 shown in FIG. 5 in that the carrier interpolation section 411 has (2L+1) taps instead of (2M+1) taps and has coefficients C0' to C2L' instead of the coefficients C0 to C2L. If the passband of the carrier interpolation filter is narrower than the guard interval, the passband is shifted in the same manner as in the first embodiment.

(Sixth Embodiment)

Figure 22:
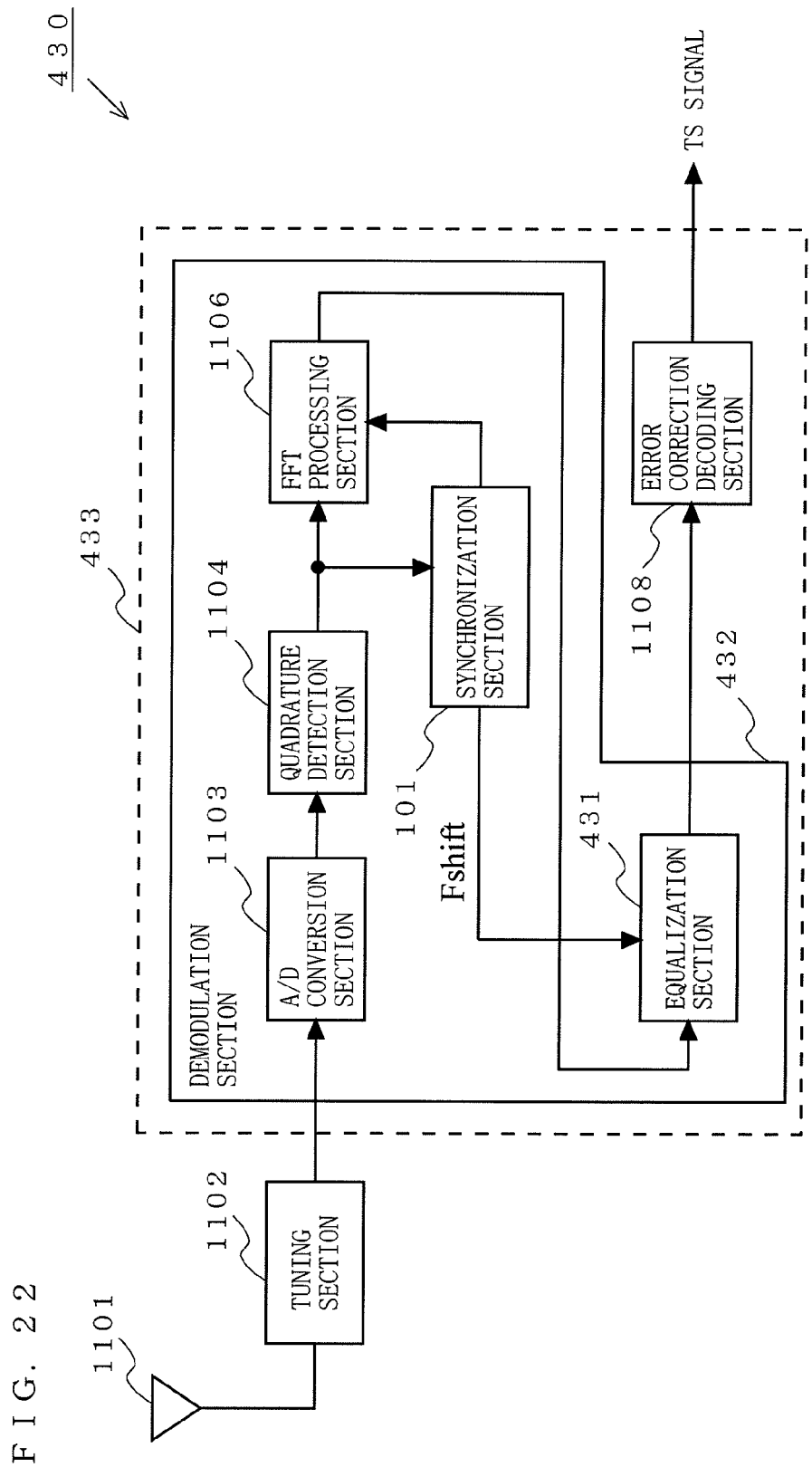
FIG. 22 shows a configuration of an OFDM receiving apparatus 430 according to a sixth embodiment of the present invention.

FIG. 22 shows a configuration of an OFDM receiving apparatus 430 according to the sixth embodiment of the present invention. The OFDM receiving apparatus 430 according to the sixth embodiment includes the antenna 1101, the tuning section 1102, a demodulation section 432, and the error correction decoding section 1108. The demodulation section 432 includes the A/D conversion section 1103, the quadrature detection section 1104, the synchronization section 101, the FFT processing section 1106, and an equalization section 431.

The OFDM receiving apparatus 430 is different from the OFDM receiving apparatus 200 according to the second embodiment shown in FIG. 8 with respect to a configuration of the equalization section 431. It is noted that, since configurations other than the equalization section 431 are the same as in the OFDM receiving apparatus 200, these configurations will be denoted by the same reference numerals, and description thereof is omitted. Hereinafter, processing performed by the equalization section 431 will be described in detail. The equalization section 431 performs two types of the 4-symbol equalization, which use different passbands, while switching between the two types.

Figure 23:
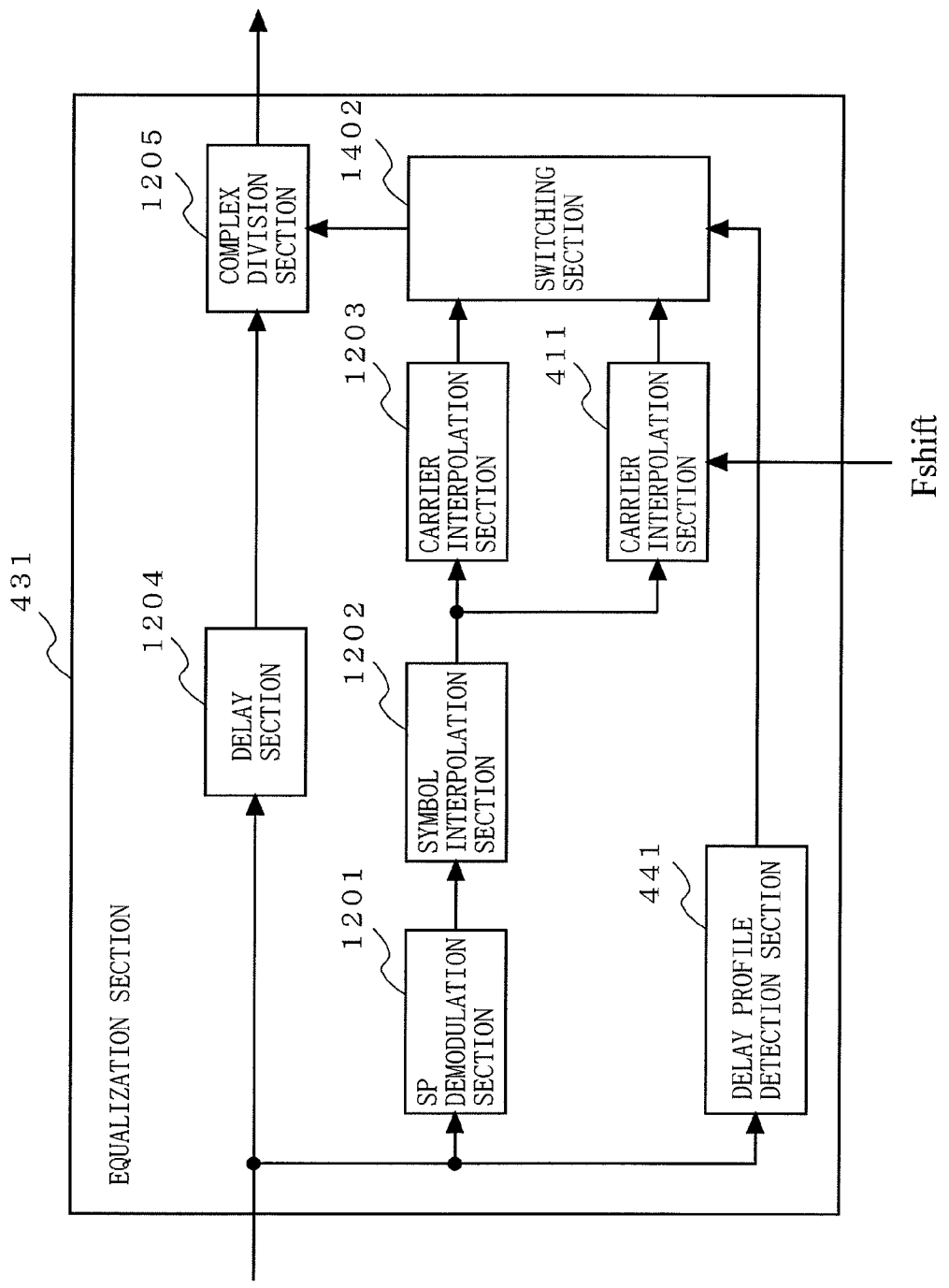
FIG. 23 shows in detail a configuration of an equalization section 431.
Figure 24:
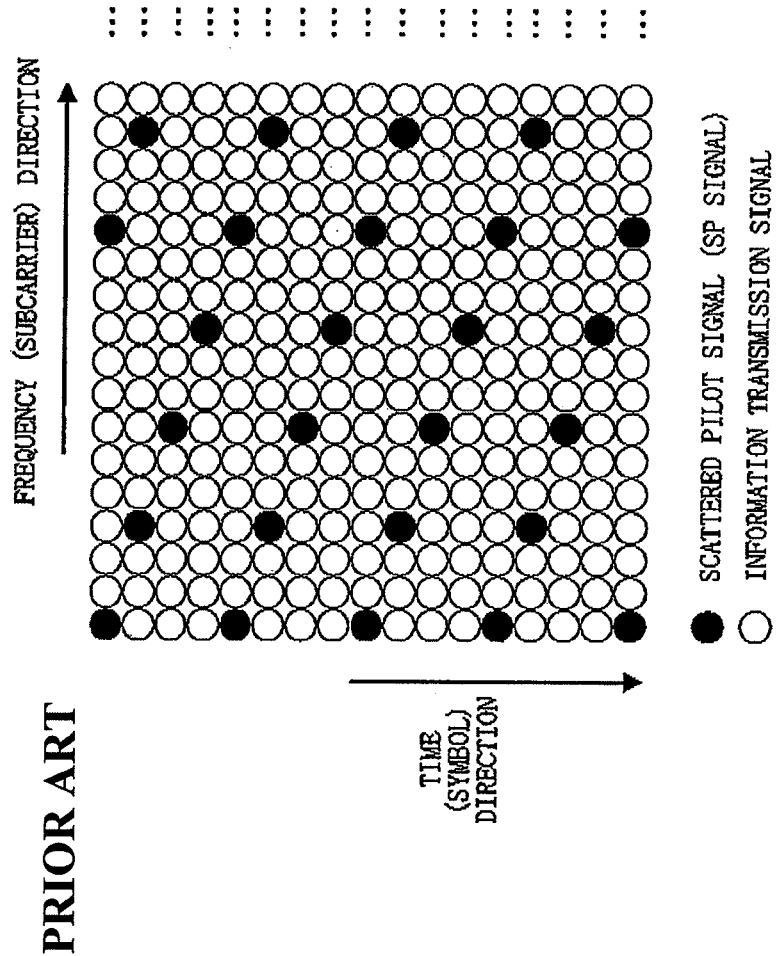
FIG. 24 shows a general arrangement of the SP signals.
Figure 25:
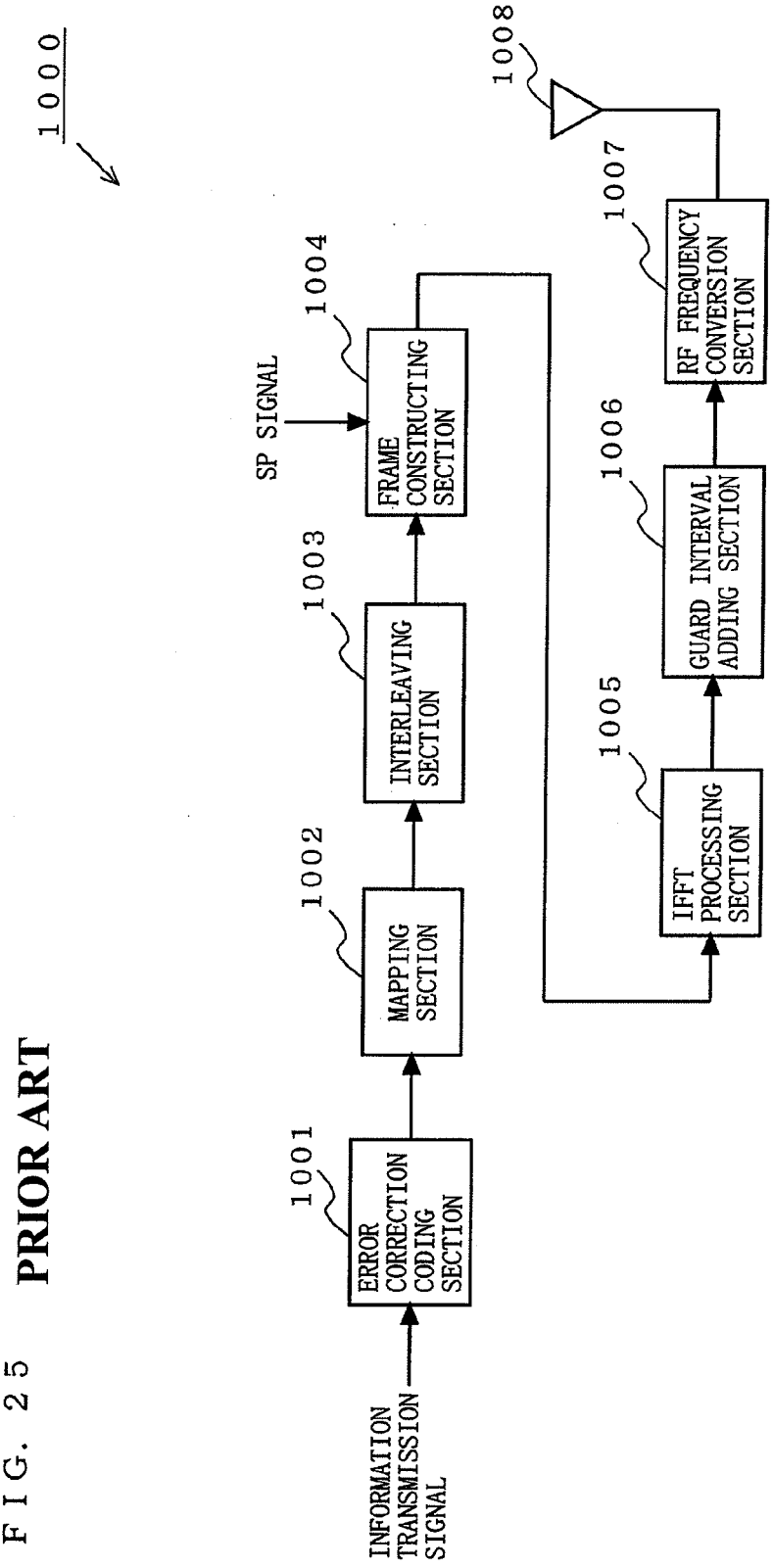
FIG. 25 shows a configuration of a conventional OFDM transmitting apparatus 1000.
Figure 26:
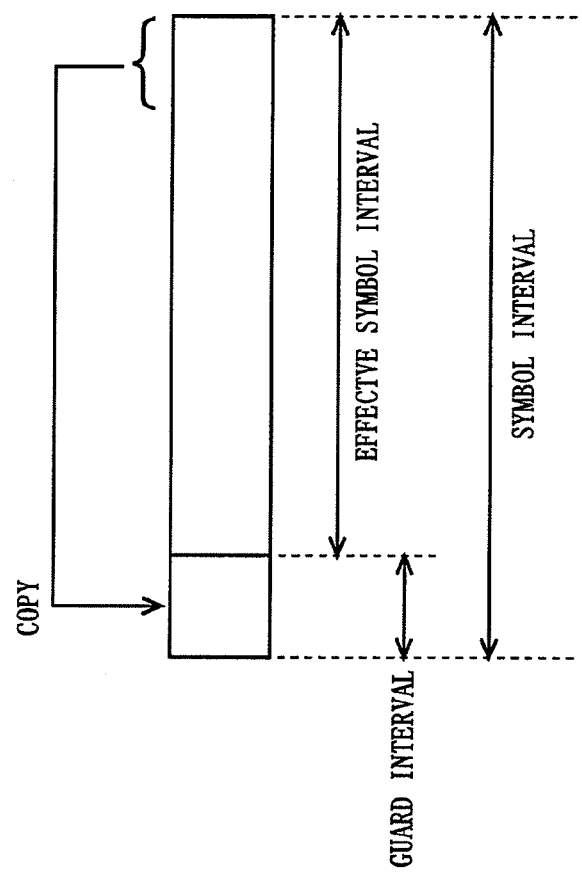
FIG. 26 is a diagram for describing a guard interval.

FIG. 23 shows in detail a configuration of the equalization section 431. The equalization section 431 is different from the equalization section 202 of the second embodiment shown in FIG. 9 with respect to a carrier interpolation section 411 for the 4-symbol equalization and a delay profile detection section 441. The delay profile detection section 441 detects a delay profile, and based on the result of the detection, switches between the carrier interpolation sections 1203 and 411 respectively for the two types of the 4-symbol equalization which use different passbands.

As described above, the OFDM receiving apparatus according to any one of the third to sixth embodiments of the present invention also makes it possible to keep a delay profile of an arrival wave within the passband of a carrier interpolation filter and perform transmission path estimation, without limiting a range of an FFT window position.

Typically, the function blocks (104, 204, 324, 363, and 433) of the demodulation section and the error correction decoding section of each embodiment are realized as LSI circuits, which are integrated circuits. Each of these LSI circuits may be formed into a chip, or part of or all of them may be formed into one chip. Alternatively, a part involved in communications performed in the system and a part involved in reception and transmission of coexistence signals may be formed into chips as separate LSI circuits, respectively. Although the above integrated circuits are referred to as LSI circuits, they may be referred to as ICs, system LSI circuits, super LSI circuits, or ultra LSI circuits, depending on their integration degree.

Moreover, a method of forming integrated circuits is not limited to LSI. The integrated circuits may be realized by using a dedicated circuit or a general-purpose processor. After manufacturing the LSI circuits, an FPGA (Field Programmable Gate Array) which is capable of programming, or a reconfigurable processor which is capable of reconfiguring the connections or setting of the circuit cells in the LSI circuits, may be used.

Moreover, if an integrated circuit forming technique which can replace LSI is realized owing to advancement of semiconductor technology or another technology derived therefrom, it is obvious that such technology may be used for integrating the function blocks. There is a possibility that biotechnology is adopted.

Moreover, the object of the present invention can also be realized by writing, in a program memory, the processing described in the above embodiments as a program, and causing a CPU to perform demodulation processing in real time.

Industrial Applicability

The present invention is applicable to a reception apparatus or a radio reception apparatus for digital terrestrial broadcasting, and is useful particularly when the passband of a carrier interpolation filter is narrower than the guard interval.

The invention claimed is:

1. An OFDM receiving apparatus for receiving an OFDM signal, the OFDM receiving apparatus comprising:
    a Fourier transform section configured to transform a signal in a time domain into a signal in a frequency domain;
    an equalization section configured to calculate a transmission path frequency response from the signal in the frequency domain outputted by the Fourier transform section, and perform equalization processing on the signal in the frequency domain based on the transmission path frequency response; and
    a synchronization section configured to establish synchronization and determine a shift amount based on profile information of an arrival wave,
    wherein the equalization section includes a carrier interpolation section configured to shift, in calculating the transmission path frequency response, a position of a passband which is narrower than a guard interval of the OFDM signal according to the shift amount determined by the synchronization section, which is determined so as to increase energy of the transmission path frequency response included in the passband, and
    wherein the synchronization section obtains the profile information of the arrival wave by calculating a correlation among guard intervals of the OFDM signal.

2. The OFDM receiving apparatus according to claim 1, wherein the equalization section further includes:
    a second carrier interpolation section having a passband different from that of the carrier interpolation section; and
    a switching section configured to select either an output of the carrier interpolation section or an output of the second carrier interpolation section.

3. The OFDM receiving apparatus according to claim 1, wherein the synchronization section determines the shift amount based on the profile information of the arrival wave such that a position of a guard interval correlation's center of gravity which is defined by using a balance between powers or amplitudes within bins of a profile and delay times within the bins, is shifted to the center of the passband of a carrier interpolation filter.

4. The OFDM receiving apparatus according to claim 1, wherein the carrier interpolation section includes:
    a plurality of delay elements for delaying an input;
    a plurality of multipliers for multiplying outputs of the plurality of delay elements by coefficients used in interpolation processing in a carrier direction, respectively;
    a passband shift section for calculating, based on the shift amount, phase rotation amounts respectively for outputs of the plurality of multipliers, and performing phase rotation processing on the outputs of the plurality of multipliers by the phase rotation amounts, respectively; and
    an adder for summing and outputting all outputs of the passband shift section.

5. The OFDM receiving apparatus according to claim 1, wherein the carrier interpolation section includes:
    a plurality of delay elements for delaying an input;
    a passband shift section for calculating, based on the shift amount, phase rotation amounts respectively for outputs of the plurality of delay elements, and performing phase rotation processing on the outputs of the plurality of delay elements by the phase rotation amounts, respectively;
    a plurality of multipliers for multiplying outputs of the passband shift section by coefficients used in interpolation processing in a carrier direction, respectively; and
    an adder for summing and outputting all outputs of the plurality of multipliers.

6. The OFDM receiving apparatus according to claim 1, wherein the carrier interpolation section includes:
    a plurality of delay elements for delaying an input;
    a passband shift section for calculating, based on the shift amount, phase rotation amounts respectively for coefficients used in interpolation processing in a carrier direction, and performing phase rotation processing on the coefficients used in interpolation processing in a carrier direction by the phase rotation amounts, respectively;
a plurality of multipliers for multiplying outputs of the plurality of delay elements by outputs of the passband shift section, respectively; and
an adder for summing and outputting all outputs of the plurality of multipliers.

7. The OFDM receiving apparatus according to claim 2, wherein the synchronization section determines the shift amount based on the profile information of the arrival wave such that a position of a guard interval correlation's center of gravity which is defined by using a balance between powers or amplitudes within bins of a profile and delay times within the bins, is shifted to the center of the passband of a carrier interpolation filter.

8. The OFDM receiving apparatus according to claim 2, wherein the carrier interpolation section includes:
a plurality of delay elements for delaying an input;
a plurality of multipliers for multiplying outputs of the plurality of delay elements by coefficients used in interpolation processing in a carrier direction, respectively;
a passband shift section for calculating, based on the shift amount, phase rotation amounts respectively for outputs of the plurality of multipliers, and performing phase rotation processing on the outputs of the plurality of multipliers by the phase rotation amounts, respectively; and
an adder for summing and outputting all outputs of the passband shift section.

9. The OFDM receiving apparatus according to claim 3, wherein the carrier interpolation section includes:
a plurality of delay elements for delaying an input;
a plurality of multipliers for multiplying outputs of the plurality of delay elements by coefficients used in interpolation processing in a carrier direction, respectively;
a passband shift section for calculating, based on the shift amount, phase rotation amounts respectively for outputs of the plurality of multipliers, and performing phase rotation processing on the outputs of the plurality of multipliers by the phase rotation amounts, respectively; and
an adder for summing and outputting all outputs of the passband shift section.

10. The OFDM receiving apparatus according to claim 5, wherein the synchronization section determines the shift amount based on the profile information of the arrival wave such that a position of a guard interval correlation's center of gravity which is defined by using a balance between powers or amplitudes within bins of a profile and delay times within the bins, is shifted to the center of the passband of a carrier interpolation filter.

11. An integrated circuit used for an OFDM receiving apparatus for receiving an OFDM signal, the integrated circuit integrating circuits which function as:
a Fourier transform section configured to transform a signal in a time domain into a signal in a frequency domain;
a synchronization section configured to establish synchronization and determine a shift amount based on profile information of an arrival wave;
an equalization section configured to calculate a transmission path frequency response from the signal in the frequency domain outputted by the Fourier transform section, and perform equalization processing on the signal in the frequency domain based on the transmission path frequency response, while shifting a position of a passband which is narrower than a guard interval of the OFDM signal according to the shift amount determined by the synchronization section, which is determined so as to increase energy of the transmission path frequency response included in the passband; and
an error correction section for correcting an error of a signal outputted by the equalization section,
wherein the synchronization section obtains the profile information of the arrival wave by calculating a correlation among guard intervals of the OFDM signal.

12. An OFDM receiving circuit for receiving an OFDM signal, the OFDM receiving circuit comprising:
a tuning section configured to selectively receive a signal of a tuned frequency channel;
a demodulation section configured to demodulate the signal selectively received by the tuning section;
a synchronization section configured to establish synchronization and determine a shift amount based on profile information of an arrival wave; and
an error correction section configured to correct an error of the signal demodulated by the demodulation section,
wherein the demodulation section includes:
a Fourier transform section configured to transform a signal in a time domain into a signal in a frequency domain; and
an equalization section configured to calculate a transmission path frequency response from the signal in the frequency domain outputted by the Fourier transform section, and perform equalization processing on the signal in the frequency domain based on the transmission path frequency response,
wherein the equalization section includes a carrier interpolation section configured to shift, in calculating the transmission path frequency response, a position of a passband which is narrower than a guard interval of the OFDM signal according to the shift amount determined by the synchronization section, which is determined so as to increase energy of the transmission path frequency response included in the passband, and
wherein the synchronization section obtains the profile information of the arrival wave by calculating a correlation among guard intervals of the OFDM signal.

13. An OFDM receiving method for receiving an OFDM signal, the OFDM receiving method comprising:
transforming a signal in a time domain into a signal in a frequency domain;
calculating a transmission path frequency response from the signal in the frequency domain and performing equalization processing on the signal in the frequency domain based on the transmission path frequency response;
determining, in calculating the transmission path frequency response, whether or not a passband is narrower than a guard interval of the OFDM signal;
obtaining profile information of an arrival wave by calculating a correlation among guard intervals of the OFDM signal;
establishing synchronization and determining a shift amount based on the profile information of the arrival wave; and
shifting, when the passband is narrower than the guard interval, a position of the passband according to the shift amount which is determined so as to increase energy of the transmission path frequency response included in the passband.

* * * * *

UNITED STATES PATENT AND TRADEMARK OFFICE
CERTIFICATE OF CORRECTION

| | | |
|---|---|---|
| PATENT NO. | : 8,416,844 B2 | Page 1 of 1 |
| APPLICATION NO. | : 12/593127 | |
| DATED | : April 9, 2013 | |
| INVENTOR(S) | : Mikihiro Ouchi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 711 days.

Signed and Sealed this
Thirteenth Day of May, 2014

Michelle K. Lee
*Deputy Director of the United States Patent and Trademark Office*